(12) United States Patent
Michitaka et al.

(10) Patent No.: US 10,703,895 B2
(45) Date of Patent: Jul. 7, 2020

(54) WATER-SOLUBLE FILM AND METHOD FOR MANUFACTURING SAME

(71) Applicant: NIPPON SHOKUBAI CO., LTD., Osaka-shi, Osaka (JP)

(72) Inventors: Daisuke Michitaka, Osaka (JP); Masami Hattori, Osaka (JP); Hirotaka Mizoguchi, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 16/065,602

(22) PCT Filed: Dec. 19, 2016

(86) PCT No.: PCT/JP2016/087814
§ 371 (c)(1),
(2) Date: Jun. 22, 2018

(87) PCT Pub. No.: WO2017/110749
PCT Pub. Date: Jun. 29, 2017

(65) Prior Publication Data
US 2019/0002683 A1 Jan. 3, 2019

(30) Foreign Application Priority Data
Dec. 24, 2015 (JP) .................. 2015-252310

(51) Int. Cl.
| | |
|---|---|
| *C08L 33/02* | (2006.01) |
| *C08J 5/18* | (2006.01) |
| *C08L 29/10* | (2006.01) |
| *C08L 101/02* | (2006.01) |
| *C11D 3/37* | (2006.01) |
| *C08L 101/14* | (2006.01) |
| *C08F 220/06* | (2006.01) |
| *B65D 65/46* | (2006.01) |
| *C08L 29/04* | (2006.01) |
| *C08L 29/06* | (2006.01) |
| *C11D 17/04* | (2006.01) |

(52) U.S. Cl.
CPC .............. *C08L 33/02* (2013.01); *B65D 65/46* (2013.01); *C08F 220/06* (2013.01); *C08J 5/18* (2013.01); *C08L 29/04* (2013.01); *C08L 29/06* (2013.01); *C08L 29/10* (2013.01); *C08L 101/02* (2013.01); *C08L 101/14* (2013.01); *C11D 3/3753* (2013.01); *C11D 3/3757* (2013.01); *C11D 3/3788* (2013.01); *C11D 17/042* (2013.01); *C08J 2300/14* (2013.01); *C08J 2329/04* (2013.01); *C08J 2329/06* (2013.01); *C08J 2333/02* (2013.01); *C08J 2333/14* (2013.01); *C08J 2400/14* (2013.01); *C08J 2429/04* (2013.01); *C08J 2429/06* (2013.01); *C08J 2433/02* (2013.01); *C08L 2203/16* (2013.01)

(58) Field of Classification Search
CPC .......... C08L 33/02; C08L 29/04; C08L 29/06; C08L 101/06; C08L 101/02; C08L 2203/16; B65D 65/46; C11D 17/042; C08J 2429/04; C08J 2429/06; C08J 2329/04; C08J 2329/06; C08J 2333/02; C08J 2433/02
USPC ........ 428/35.7; 510/439, 441, 442; 524/224, 524/247; 525/57; 264/4
See application file for complete search history.

(56) References Cited

U.S. PATENT DOCUMENTS

| | | |
|---|---|---|
| 4,119,604 A | 10/1978 | Wysong |
| 4,155,971 A | 5/1979 | Wysong |
| 4,156,047 A | 5/1979 | Wysong |
| 5,389,724 A | 2/1995 | LaFleur |
| 5,403,875 A | 4/1995 | Bortnick et al. |
| 6,211,129 B1 | 4/2001 | Gladfelter et al. |
| 6,455,484 B1 | 9/2002 | Gladfelter et al. |
| 2003/0119694 A1 | 6/2003 | Gladfelter et al. |
| 2004/0219297 A1 | 11/2004 | Raehse et al. |
| 2004/0259757 A1 | 12/2004 | Gladfelter et al. |
| 2006/0040845 A1 | 2/2006 | Gladfelter et al. |
| 2009/0196897 A1 | 8/2009 | Gladfelter et al. |

(Continued)

FOREIGN PATENT DOCUMENTS

| | | |
|---|---|---|
| EP | 0 490 562 | 12/1991 |
| EP | 1 158 016 | 11/2001 |

(Continued)

OTHER PUBLICATIONS

International Preliminary Report on Patentability issued in International Application No. PCT/JP2016/087814, dated Jun. 28, 2018, 5 pages.

*Primary Examiner* — Ruiyun Zhang
(74) *Attorney, Agent, or Firm* — Hamre, Schumann, Mueller & Larson, P.C.

(57) ABSTRACT

The present invention provides a water-soluble film having excellent solubility in cold water, high strength, and excellent hard-water resistance. The present invention also provides a method for simply producing such a water-soluble film. One aspect of the present invention relates to a water-soluble film including a polymer containing an anionic group other than a sulfonic acid (salt) group, and a water-soluble resin. The anionic group-containing polymer excludes an acrylic acid homopolymer. Another aspect of the present invention relates to a method for producing a water-soluble film that includes a polymer containing an anionic group other than a sulfonic acid (salt) group, and a water-soluble resin. The method includes mixing a polymer containing an anionic group other than a sulfonic acid (salt) group and a water-soluble resin.

15 Claims, No Drawings

(56) References Cited

U.S. PATENT DOCUMENTS

| | | | |
|---|---|---|---|
| 2012/0302489 A1* | 11/2012 | Rodrigues | C08F 212/08 510/439 |
| 2013/0256182 A1 | 10/2013 | Petrovicova et al. | |
| 2018/0355165 A1 | 12/2018 | Michitaka | |

FOREIGN PATENT DOCUMENTS

| | | |
|---|---|---|
| EP | 1 251 147 | 10/2002 |
| JP | 53-024351 | 3/1978 |
| JP | 61-097348 | 5/1986 |
| JP | 6-065463 | 3/1994 |
| JP | 6-116598 | 4/1994 |
| JP | 9-324096 | 12/1997 |
| JP | 3135066 | 2/2001 |
| JP | 2001-152031 | 6/2001 |
| JP | 2001-206435 | 7/2001 |
| JP | 2002-003896 | 1/2002 |
| JP | 3262406 | 3/2002 |
| JP | 2007-070493 | 3/2007 |
| WO | 94/04656 | 3/1994 |
| WO | 2006/107060 | 10/2006 |
| WO | 2012/043193 | 4/2012 |
| WO | 2017/094856 | 6/2017 |

\* cited by examiner

WATER-SOLUBLE FILM AND METHOD FOR MANUFACTURING SAME

TECHNICAL FIELD

The present invention relates to a water-soluble film and a method for producing the water-soluble film.

BACKGROUND ART

Recently, detergents or chemicals such as agrochemicals are hermetically-packaged (unit-packaged) with a water-soluble film in certain amounts and the packaged products are directly put into water for the convenience of the consumer and the safe use by the consumer. As the water-soluble film dissolves in water, the contents are released. Thus, the effects of the contents are obtained. Such a technique is quite useful in the packaging field because it enables the use of the contents without direct touching and eliminates the measure of the amount of the contents and disposal of the package films.

Water-soluble films are typically made of a partially saponified polyvinyl alcohol-based polymer (also referred to as PVA) in terms of water solubility and strength. However, films made of PVA are poor in properties such as solubility in cold water. In order to solve such a problem, a technique of partial anionic modification of PVA or introduction of a water-soluble monomer into PVA by copolymerization has been proposed (see, for example, Patent Documents 1 to 5). In addition to these, water-soluble films made of PVA for packaging chemicals or detergents, for example, are also disclosed (see, for example, Patent documents 6 to 9).

CITATION LIST

Patent Document

Patent Document 1: JP 2007-70493 A
Patent Document 2: JP 2001-206435 A
Patent Document 3: JP H09-324096 A
Patent Document 4: JP 2002-3896 A
Patent Document 5: JP 3262406 B
Patent Document 6: JP 3135066 B
Patent Document 7: US 2013/0256182
Patent Document 8: JP S53-24351 A
Patent Document 9: US 2004/0219297

SUMMARY OF INVENTION

Technical Problem

Various proposals have been made for improving the physical properties of a film made of PVA as described above. However, these methods are not enough to provide sufficient solubility in water (water solubility), particularly in cold water (for example, having a temperature of 0° C. to 15° C.), and films showing a high dissolution rate even in cold water have not yet been obtained. There are also the following problems: reduction in film strength due to partial anionic modification of PVA or introduction of a water-soluble monomer and possible formation of a salt and precipitation thereof when a film is put into hard water.

The present invention has been made in view of the state of the art, and aims to provide a water-soluble film having high solubility in cold water, high strength, and excellent hard-water resistance. The present invention also aims to provide a method for simply producing such a water-soluble film.

Solution to Problem

The present inventors made various examinations on a water-soluble film and found that a water-soluble film having a structure that includes a polymer containing an anionic group other than a sulfonic acid (salt) group (excluding an acrylic acid homopolymer) has high strength while a decrease in the film strength is sufficiently suppressed and excellent solubility in water, particularly in cold water. Further, such a water-soluble film has remarkably improved hard-water resistance, and therefore, the formation of a salt and precipitation thereof are sufficiently suppressed even when the film is put into hard water. These effects are further exerted particularly in the case where the water-soluble film additionally contains a water-soluble resin such as a polyvinyl alcohol-based polymer or in the case where the water-soluble film contains a polymer with a predetermined group as an anionic group-containing polymer. The present inventors also found that such a water-soluble film can exhibit deodorant properties, dispersibility of inorganic particles, anti-soil redeposition properties, and detergency. The present inventors also found that the water-soluble film can be simply and readily obtained by a production method that includes polymerizing a monomer component containing an anionic group-containing monomer or a production method that includes mixing an anionic group-containing polymer obtained in the polymerization step with a water-soluble resin (preferably a polyvinyl alcohol-based polymer). As a result, the above-mentioned problems have been admirably solved, leading to completion of the present invention.

The "anionic group" herein does not encompass a sulfonic acid (salt) group.

That is, one aspect of the present invention relates to a water-soluble film including:

a polymer containing an anionic group other than a sulfonic acid (salt) group; and a water-soluble resin, the anionic group-containing polymer excluding an acrylic acid homopolymer.

Another aspect of the present invention relates to a composition including:

a polymer containing an anionic group other than a sulfonic acid (salt) group; and a water-soluble resin, the anionic group-containing polymer excluding an acrylic acid homopolymer.

Another aspect of the present invention relates to a method for producing a water-soluble film that includes a polymer containing an anionic group other than a sulfonic acid (salt) group and a water-soluble resin, the anionic group-containing polymer excluding an acrylic acid homopolymer, the method including the steps of:

polymerizing a monomer component including an anionic group-containing monomer; and mixing an anionic group-containing polymer obtained in the polymerization step with a water-soluble resin.

Another aspect of the present invention relates to a packaged product including:

the water-soluble film of the present invention; and a chemical and/or a detergent packaged in the water-soluble film.

Another aspect of the present invention relates to a method for producing a packaged product, including packaging a chemical and/or a detergent with the water-soluble film of the present invention.

Another aspect of the present invention relates to a packaging method including packaging a chemical and/or a detergent with the water-soluble film of the present invention.

Advantageous Effects of Invention

The water-soluble film of the present invention has high solubility in water, particularly in cold water, high strength, and excellent hard-water resistance, and is therefore useful for various uses such as packaging materials. The composition of the present invention is suitable for simply obtaining the water-soluble film of the present invention. The packaged product of the present invention is very useful when it is directly put into water and the contents are used as a chemical or a detergent. The method for producing a water-soluble film of the present invention is capable of simply and readily providing such a water-soluble film, and is therefore useful particularly in the technical field of packaging materials, for example. The method for producing a packaged product of the present invention is capable of simply providing such a packaged product. The packaging method of the present invention is capable of simply packaging a chemical and/or a detergent.

DESCRIPTION OF EMBODIMENTS

Preferred embodiments of the present invention are described in detail below, but the present invention is not limited thereto. The preferred embodiments may be appropriately altered within the scope of the present invention. Combinations of two or three or more of the below-described preferred embodiments of the present invention are also preferred embodiments of the present invention.

[Water-Soluble Film]

The water-soluble film of the present invention contains an anionic group-containing polymer and a water-soluble resin other than the anionic group-containing polymer. The water-soluble film of the present invention may contain only an anionic group-containing polymer as an essential component. For example, the water-soluble film may consist only of an anionic group-containing polymer. Such a water-soluble film containing an anionic group-containing polymer is also one aspect of the present invention. The water-soluble film may optionally contain a different component as needed. The water-soluble film may contain one or two or more types of each of the components.

The water-soluble film preferably mainly includes a water-soluble resin and an anionic group-containing polymer. The phrase "the water-soluble film mainly includes a water-soluble resin and an anionic group-containing polymer" means that the proportion by mass of the water-soluble resin and the proportion by mass of the anionic group-containing polymer are both larger than the proportion(s) by mass of the component(s) other than the water-soluble resin and the anionic group-containing polymer. Here, the water-soluble film may consist only of a water-soluble resin and an anionic group-containing polymer. The blending ratio by mass between the water-soluble resin and the anionic group-containing polymer (water-soluble resin/anionic group-containing polymer) is preferably (1 to 99)/(99 to 1), for example. In terms of the balance between the film strength and the solubility in cold water, the proportion of the water-soluble resin is preferably 1% by mass or more, more preferably 5% by mass or more, still more preferably 10% by mass or more, further preferably 20% by mass or more, further more preferably 30% by mass or more, still further more preferably 35% by mass or more, particularly preferably 37% by mass or more, more particularly preferably 40% by mass or more of 100% by mass of the total amount of the water-soluble resin and the anionic group-containing polymer (a larger value is better). The proportion of the water-soluble resin is preferably 99% by mass or less, more preferably 98% by mass or less, still more preferably 95% by mass or less, further more preferably 90% by mass or less (a smaller value is better). In other words, the proportion of the anionic group-containing polymer is preferably 1% by mass or more, more preferably 2% by mass or more, still more preferably 5% by mass or more, further more preferably 10% by mass or more of 100% by mass of the total amount of the water-soluble resin and the anionic group-containing polymer (a larger value is better). The proportion of the anionic group-containing polymer is preferably 99% by mass or less, more preferably 95% by mass or less, still more preferably 90% by mass or less, further preferably 80% by mass or less, further more preferably 70% by mass or less, still further more preferably 65% by mass or less, particularly preferably 63% by mass or less, more particularly preferably 60% by mass or less (a smaller value is better).

The thickness of the water-soluble film may be appropriately set in accordance with factors such as its uses, and is preferably, but not limited to, 5 to 300 µm in terms of the balance between the film strength and the solubility of the film in cold water, for example. The thickness is more preferably 6 to 200 µm, still more preferably 7 to 150 µm, further preferably 8 to 100 µm, particularly preferably 9 to 90 µm, most preferably 10 to 80 µm.

When the water-soluble film has a thickness of 40 µm, the dissolution time thereof in cold water having a temperature of 6° C. is preferably 5 to 240 seconds. The dissolution time is more preferably 6 to 200 seconds, still more preferably 7 to 180 seconds, particularly preferably 8 to 160 seconds, further preferably 9 to 140 seconds, further more preferably 10 to 120 seconds, most preferably 15 to 100 seconds. A film dissolving too quickly (the dissolution time is too short) may have high moisture absorbency and may fail to sufficiently keep the film shape under usual storage conditions due to moisture in the air. A film dissolving too slowly (the dissolution time is too long) may fail to more efficiently release chemicals. The dissolution time (in the case of 40 µm) may be determined based on the solubility evaluation method described in the Examples below.

When the water-soluble film has a thickness of 40 µm, the film preferably has a strength of 0.05 J or higher. The film having a strength of 0.05 J or higher may stably maintain the packaging of chemicals or detergents. On the other hand, a film having a strength of lower than 0.05 J may be broken when an impact is applied thereto, and chemicals may leak therefrom. The strength is more preferably 0.08 J or higher, still more preferably 0.1 J or higher. The film strength (in the case of 40 µm) may be determined based on the strength evaluation method described in the Examples below.

The water-soluble film also preferably has a hard water resistance of 94% or higher. The film having hard water resistance of 94% or higher may not cause precipitation or turbidity of water when the film is put into hard water. On the other hand, in the case of a film having hard water resistance of lower than 94%, it is difficult to more sufficiently suppress the formation of a salt and precipitation thereof and the turbidity of water when the film is put into hard water. The hard water resistance is more preferably 95% or higher, still more preferably 96% or higher, particularly preferably 97% or higher. The hard water resistance may be determined based on the hard water resistance evaluation method described in the Examples below.

The following further describes the water-soluble resin, the anionic group-containing polymer, and other suitable components in the water-soluble film.

<Water-Soluble Resin>

The water-soluble resin used in the present invention is readily soluble or dispersible in water. Specifically, the water-soluble resin is preferably a resin having a solubility of 0.05 g or more, more preferably 0.1 g or more in 100 g of water having a temperature of 20° C. The resin may be made of any material as long as it has such properties. For example, cellulose derivatives such as cellulose, methyl cellulose, hydroxypropyl cellulose, carboxymethyl cellulose, and salts thereof; polyvinyl alcohol-based materials; pullulan; starch-based materials; and polyalkylene oxide-based materials may be used.

The water-soluble resin is available under the following trade names, for example: Pullulan Film (produced by Hayashibara Co., Ltd.) made of pullulan; Dissolvo (produced by Mishima Paper Co., Ltd.) made of cellulose and a sodium salt of carboxymethyl cellulose; SOLUBLON (produced by Aicello Corporation), Hi-Selon (produced by PVOH Film), Tosslon (produced by Tokyo Cellophane Co., Ltd.), and KURARAY VINYLON FILM (produced by Kuraray Co., Ltd.), which are made of a polyvinyl alcohol-based polymer; and ALKOX (polyethylene oxide resin) film (produced by Meisei Chemical Works, Ltd.) and Flexine (a film formed of a water-soluble resin Paogen including polyoxyalkylene glycol, polycarboxylic acid, and a lower alkyl ester thereof, produced by Dai-Ichi Kogyo Seiyaku Co., Ltd.) as polyalkylene oxide-based products.

In particular, the water-soluble resin is particularly preferably a polyvinyl alcohol-based polymer in terms of film strength and water solubility, for example. That is, the water-soluble film of the present invention particularly preferably includes a polyvinyl alcohol-based polymer and an anionic group-containing polymer.

The following further describes the polyvinyl alcohol-based polymer.

The polyvinyl alcohol-based polymer is prepared by polymerizing a vinyl ester and optionally a monomer other than vinyl esters (also referred to as a different monomer) as needed to prepare a polyvinyl ester (polyvinyl ester-based polymer) and saponifying the polyvinyl ester, and has a structural unit represented by the following formula (1). In the formula, n represents an average degree of polymerization and is 1 or greater.

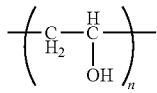

(1)

The vinyl ester (monomer) constituting the polyvinyl ester-based polymer may be one or two or more of vinyl acetate, vinyl formate, vinyl propionate, vinyl valerate, vinyl caprate, vinyl laurate, vinyl myristate, vinyl palmitate, vinyl benzoate, vinyl stearate, vinyl pivalate, and vinyl versatate. In particular, vinyl acetate is preferred in terms of productivity or availability.

The monomers constituting the polyvinyl ester-based polymer may include the above-described different monomer as needed. Examples of the different monomer include N-vinylformamide-based monomers such as N-vinylformamide and N-methyl-N-vinylformamide; N-vinylacetamide-based monomers such as N-vinylacetamide and N-methyl-N-vinylacetamide; N-vinylpyrrolidone-based monomers such as N-vinyl-2-pyrrolidone, N-vinyl-3-propyl-2-pyrrolidone, and N-vinyl-5,5-dimethyl-2-pyrrolidone; N-vinyl-caprolactam-based monomers such as N-vinyl-2-caprolactam and N-vinyl-3-propyl-2-caprolactam; oxyalkylene group-containing unsaturated monomers such as polyoxyethylene (meth)allyl ether, polyoxypropylene (meth)allyl ether, polyoxyethylene (meth)acrylate, polyoxypropylene (meth)acrylate, polyoxyethylene (meth)acrylamide, polyoxypropylene (meth)acrylamide, polyoxyethylene (1-(meth)acrylamido-1,1-dimethylpropyl)ester, polyoxyethylene vinyl ether, and polyoxypropylene vinyl ether; vinyl ether-based monomers such as methyl vinyl ether, ethyl vinyl ether, propyl vinyl ether, butyl vinyl ether, ethylene glycol vinyl ether, 1,3-propanediol vinyl ether, and 1,4-butanediol vinyl ether; α-olefins such as ethylene, propylene, and 1-hexene; acrylamide derivatives such as acrylamide and N-methylacrylamide; methacrylamide derivatives such as methacrylamide and N-methylmethacrylamide; allyl acetate; allyl ethers such as propyl allyl ether; vinylsilanes such as vinyltrimethoxysilane; isopropenyl acetate; hydroxy group-containing α-olefins such as 3-buten-1-ol, 4-penten-1-ol, 5-hexen-1-ol, and 7-octen-1-ol; monomers containing a sulfonic acid group derived from ethylenesulfonic acid, allylsulfonic acid, methallylsulfonic acid, or 2-acrylamido-2-methylpropanesulfonic acid, for example; and monomers containing a cationic group derived from vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, or allylethylamine, for example. One or two or more of these may be used.

The amount of the different monomer is preferably 50 mol % or less, more preferably 20 mol % or less, still more preferably 10 mol % or less, particularly preferably 1 mol % or less of 100 mol % of all the monomers constituting the polyvinyl ester-based polymer.

The polyvinyl alcohol-based polymer preferably has an average degree of saponification of 50 to 100 mol % in order to more enhance the film strength and the solubility in cold water, for example. The average degree of saponification is more preferably 60 mol % or more, still more preferably 70 mol % or more. The average degree of saponification is more preferably less than 100 mol %, still more preferably 99 mol % or less, particularly preferably 95 mol % or less. Saponification will be described in more detail below.

The average degree of polymerization (n in the formula (1)) of the polyvinyl alcohol-based polymer is preferably 200 to 10000 in order to more enhance the film strength and the solubility in cold water, for example. The average degree of polymerization is more preferably 500 or higher, still more preferably 1000 or higher. The average degree of polymerization is more preferably 6000 or lower, still more preferably 4000 or lower.

The polyvinyl alcohol-based polymer may be produced by a method that includes polymerizing a vinyl ester and optionally a different monomer to prepare a vinyl ester-based polymer and saponifying the vinyl ester-based polymer in a solvent, for example.

The polymerization of the vinyl ester and the different monomer constituting the vinyl ester-based polymer may be performed by solution polymerization, suspension polymerization, emulsion polymerization, bulk polymerization, or precipitation polymerization, for example. When a solvent is used, known solvents such as alcohols may be used as a solvent. Examples of an initiator used in the polymerization include azo polymerization initiators such as 2,2'-azobis (isobutyronitrile) and peroxides such as benzoyl peroxide. The polymerization temperature may be set within the range of 0° C. to 150° C., for example.

The polyvinyl alcohol-based polymer can be obtained by saponifying the vinyl ester-based polymer. Examples of a saponification solvent include alcohols such as methanol and ethanol, esters such as methyl acetate and ethyl acetate, dimethyl sulfoxide, and solvent mixtures thereof. Examples of a saponification catalyst include sodium hydroxide, potassium hydroxide, sulfuric acid, hydrochloric acid, and hydrogen peroxide. Other conditions of the saponification reaction may be appropriately adjusted depending on the target degree of saponification, for example. For example, the reaction temperature and the reaction time may be set at 0° C. to 200° C. and 0.1 to 24 hours, respectively.

<Anionic Group-Containing Polymer>

The anionic group-containing polymer is a polymer that contains one or two or more types of anionic groups, with the number of each type thereof being one or two or more. Examples of the anionic group include carboxyl, phosphoric acid, carbonic acid, silicic acid, phosphonic acid, nitric acid, and sulfuric acid groups. The anionic group may be in the form of a salt, and an anionic salt group shall be encompassed in the anionic group. In the present invention, a carboxyl group and/or a salt thereof (carboxylic acid salt) are/is preferred in order to obtain more excellent solubility in cold water. An embodiment in which the anionic group is a carboxyl group and/or a salt thereof is one preferred embodiment of the present invention.

The "anionic group-containing polymer" herein excludes an acrylic acid homopolymer. An acrylic acid homopolymer is a polymer prepared by polymerizing only substituent-free acrylic acid. The water-soluble film having excellent film strength, solubility in cold water, and hard-water resistance can be obtained only when the anionic group-containing polymer in the present invention, not an acrylic acid homopolymer, is used in combination with a water-soluble resin (preferably polyvinyl alcohol-based polymer).

The anionic group-containing polymer preferably has, in addition to an anionic group, at least one group selected from the group consisting of sulfonic acid (salt) groups, cationic groups, (poly)alkylene glycol groups, hydrophobic groups, and lactam groups. In the case of containing an anionic group and any of these groups, the hard-water resistance is particularly remarkably improved, and the formation of a salt and precipitation thereof are further suppressed even when the film is put into hard water, compared to the case of containing only an anionic group. Further, in the case of containing a (poly)alkylene glycol group, for example, the solubility in cold water is further enhanced, and in the case of containing a (poly)alkylene glycol group, a hydrophobic group, or a lactam group, the effects as a plasticizer are obtained, and therefore, a reduction in film strength can be further suppressed. In the case of containing a cationic group, the effects of chelation to a heavy metal are obtained, and therefore, the hard-water resistance against heavy metals is further enhanced. In the case of containing a hydrophobic group or a lactam group, the hard-water resistance is further enhanced. Such an embodiment in which the anionic group-containing polymer further contains, in addition to the anionic group, at least one group selected from the group consisting of sulfonic acid (salt) groups, cationic groups, (poly)alkylene glycol groups, hydrophobic groups, and lactam groups is one preferred embodiment of the present invention.

The anionic group-containing polymer may further contain a polyamine backbone as long as the polymer contains an anionic group, but preferably contain no polyamine backbone. The polyamine backbone refers to a backbone having two or more amino groups, and may have a structure in which at least one of the amino groups is modified with at least one group selected from the group consisting of (poly)alkylene glycol groups, carboxylic acid (salt) groups, hydrophobic groups, and sulfonic acid (salt) groups. The polyamine backbone is formed using a polyalkylene amine or a polyalkylene imine, for example.

The anionic group-containing polymer may be one that has only a constituent unit derived from one or two or more types of anionic group-containing monomers (homopolymer) or may be one that has a constituent unit derived from one or two or more types of anionic group-containing monomers and a constituent unit derived from one or two or more types of monomers other than anionic group-containing monomers (also referred to as different monomers) (copolymer).

The constituent unit derived from an anionic group-containing monomer means a structure in which the unsaturated double bond site (C=C) of the anionic group-containing monomer is converted to a single bond (—C—C—). The same holds true for the different monomers.

In the former case (in the case where the anionic group-containing polymer is a homopolymer), the anionic group-containing monomer particularly preferably further contains, in addition to the anionic group, at least one group selected from the group consisting of sulfonic acid (salt) groups, cationic groups, (poly)alkylene glycol groups, hydrophobic groups, and lactam groups. In the latter case (in the case where the anionic group-containing polymer is a copolymer), the different monomer is particularly preferably a monomer containing at least one group selected from the group consisting of sulfonic acid (salt) groups, cationic groups, (poly)alkylene glycol groups, hydrophobic groups, and lactam groups. The copolymer encompasses a grafted polymer. It is also a preferred embodiment in the present invention that the anionic group-containing polymer is a polymer other than a grafted polymer. For example, it is a preferred embodiment in the present invention that the anionic group-containing polymer is in the form of at least one selected from the group consisting of homopolymers, alternating copolymers, random copolymers, and block copolymers.

When the anionic group-containing polymer is a copolymer, the mass ratio (a/b) between a constituent unit (a) derived from an anionic group-containing monomer and a constituent unit (b) derived from a different monomer is preferably (1 to 99)/(99 to 1). In terms of the balance among the film strength, the solubility in cold water, and the hard-water resistance, the mass ratio is more preferably (5 to 95)/(95 to 5), still more preferably (10 to 90)/(90 to 10).

The proportion of the constituent unit derived from a monomer having at least one group selected from the group consisting of sulfonic acid (salt) groups, cationic groups, (poly)alkylene glycol groups, hydrophobic groups, and lactam groups in the constituent unit (b) derived from a different monomer is preferably 50% to 100% by mass, more preferably 70% by mass or more, still more preferably 90% by mass or more of 100% by mass of the total amount of the constituent unit (b).

Examples of the grafted polymer as the copolymer include polymers obtained by graft-polymerizing a monomer component including an anionic group-containing monomer onto a polymer prepared by polymerizing a monomer component including a different monomer. Preferred are polymers obtained by graft-polymerizing an anionic group-containing monomer onto a polymer prepared by polymerizing a different monomer (particularly preferably, polyalkylene glycol such as polyethylene glycol). In this case, the proportion of the anionic group-containing monomer as a graft component is preferably 1 to 60 parts by weight relative to 100 parts by weight of the polymer prepared by polymerizing a different monomer. In terms of the balance between the film strength and the solubility in cold water, the amount is more preferably 3 to 50 parts by weight, still more preferably 5 to 40 parts by weight.

The anionic group-containing polymer may have an anionic group in the backbone chain. For example, the backbone chain of the anionic group-containing polymer preferably includes a monomer unit derived from an unsaturated monocarboxylic acid-based monomer described below.

The weight average molecular weight (Mw) of the anionic group-containing polymer is preferably, but not limited to, 2000 to 200,000, for example, in order to more increase the film strength and the solubility. The lower limit of the weight average molecular weight is more preferably 3000 or more, still more preferably 5000 or more. Meanwhile, the upper limit thereof is more preferably 150000 or less, still more preferably 100000 or less, particularly preferably 80000 or less.

The weight average molecular weight herein is a value determined by gel permeation chromatography (GPC) and may be measured under the measurement conditions described below.

The following further describes the monomers constituting the anionic group-containing polymer.
(Anionic Group-Containing Monomer)

One or two or more monomers such as carboxylic acid-based monomers and phosphoric acid-based monomers are each preferred as the anionic group-containing monomer. More preferred is a carboxylic acid-based monomer. Here, obviously, a monomer containing two or more types of anionic groups in one molecule may be used as the anionic group-containing monomer.

The following further describes a carboxylic acid-based monomer which is particularly preferred as the anionic group-containing monomer.

The carboxylic acid-based monomer is a compound that contains an unsaturated double bond (carbon-carbon double bond) and a carboxyl group and/or a carboxylic acid salt group (also referred to as a carboxylic acid (salt) group).

The phrase "contains . . . a carboxyl group and/or a carboxylic acid salt group" means that one or two or more carboxylic acid (salt) groups, that is, groups represented by —COOZ (Z represents a hydrogen atom, a metal atom, an ammonium group, or an organic amine group) are contained in one molecule. Examples of the metal atom include monovalent metals such as sodium, lithium, potassium, rubidium, and cesium; divalent metals such as magnesium, calcium, strontium, and barium; trivalent metals such as aluminum; and other metals such as iron. Examples of the organic amine group include alkanol amine groups such as a monoethanolamine group, a diethanolamine group, and a triethanolamine group; alkylamine groups such as a monoethyl amine group, a diethyl amine group, and a triethylamine group; and polyamine groups such as an ethylenediamine group and a triethylenediamine group. The carboxylic acid salt is preferably an ammonium salt, a sodium salt, or a potassium salt, more preferably a sodium salt.

The carboxylic acid-based monomer may optionally contain one or two or more unsaturated double bonds and a plurality of carboxylic acid (salt) groups in one molecule. Preferred are an unsaturated monocarboxylic acid-based monomer containing an unsaturated double bond and one carboxylic acid (salt) group in one molecule and an unsaturated dicarboxylic acid-based monomer containing an unsaturated double bond and two carboxylic acid (salt) groups in one molecule.

Examples of the unsaturated monocarboxylic acid-based monomer include unsaturated monocarboxylic acids such as (meth)acrylic acid, crotonic acid, α-hydroxyacrylic acid, α-hydroxymethylacrylic acid, and derivatives thereof, and salts thereof. The acrylic acids and the methacrylic acids are collectively referred to as "(meth)acrylic acids".

Examples of the unsaturated dicarboxylic acid-based monomer include unsaturated dicarboxylic acids such as maleic acid, itaconic acid, citraconic acid, fumaric acid, mesaconic acid, and 2-methylene glutaric acid, and salts and anhydrides thereof. Further, a half ester of the unsaturated dicarboxylic acid-based monomer and an alcohol (e.g. a C1-C22 alcohol), a half amide of the unsaturated dicarboxylic acid-based monomer and an amine (e.g. a C1-C22 amine), a half ester of the unsaturated dicarboxylic acid-based monomer and a glycol (e.g. a C2-C4 glycol), or a half amide of a maleamic acid and a glycol (e.g. a C2-C4 glycol) may be used.

Preferred among the carboxylic acid-based monomers are/is (meth)acrylic acid, maleic acid, and/or a salt thereof. More preferred are/is (meth)acrylic acid and/or a salt thereof. Thus, a water-soluble film having better solubility in cold water and strength can be obtained. Still more preferred are/is acrylic acid and/or a salt thereof.
(Different Monomer)

The different monomer is a monomer not corresponding to the anionic group-containing monomer, and has only to be a monomer copolymerizable with an anionic group-containing monomer. In particular, preferred is a monomer having at least one group selected from the group consisting of sulfonic acid (salt) groups, cationic groups, (poly)alkylene glycol groups, hydrophobic groups, and lactam groups. Specifically, preferred is at least one selected from the group consisting of sulfonic acid (salt) group-containing monomers (also referred to as sulfonic acid-based monomers), cationic group-containing monomers (also referred to as cationic monomers), (poly)alkylene glycol group-containing monomers (also referred to as PAG-based monomers), hydrophobic group-containing monomers, and lactam group-containing monomers. Here, obviously, the "monomer having at least one group selected from the group consisting of sulfonic acid (salt) groups, cationic groups, (poly)alkylene glycol groups, hydrophobic groups, and lactam groups" encompasses a monomer having two or more groups of sulfonic acid (salt) groups, cationic groups, (poly)alkylene glycol groups, hydrophobic groups, and lactam groups in one molecule.

The following further describes a sulfonic acid (salt) group-containing monomer, a cationic group-containing monomer, a (poly)alkylene glycol group-containing monomer, a hydrophobic group-containing monomer, and a lactam group-containing monomer each preferred as a different monomer.

(i) Sulfonic Acid-Based Monomer

The sulfonic acid-based monomer is a compound that contains an unsaturated double bond (carbon-carbon double bond) and a sulfonic acid group and/or a sulfonic acid salt group (also referred to as a sulfonic acid (salt) group).

The phrase "contains . . . a sulfonic acid group and/or a sulfonic acid salt group" means that one or two or more sulfonic acid (salt) groups, that is, groups represented by —SO$_3$Z (Z represents a hydrogen atom, a metal atom, an ammonium group, or an organic amine group) are contained in one molecule. The metal atom and the organic amine group are as described above. The sulfonic acid salt is preferably an ammonium salt, a sodium salt, or a potassium salt, more preferably a sodium salt.

Specific examples of the sulfonic acid-based monomer include unsaturated sulfonic acids such as vinylsulfonic acid, styrenesulfonic acid, (meth)allylsulfonic acid, 3-(meth)allyloxy-2-hydroxypropanesulfonic acid, 3-(meth)allyloxy-1-hydroxypropanesulfonic acid, 2-(meth)allyloxyethylenesulfonic acid, 2-acrylamido-2-methylpropanesulfonic acid, (meth)allyloxybenzenesulfonic acid, isoprenesulfonic acid, 2-methylpropanesulfonic acid (meth)acrylamide, 2-hydroxy-3-allyloxysulfonic acid, sulfoethyl (meth)acrylate, sulfopropyl (meth)acrylate, and sulfobutyl (meth)acrylate and salts thereof.

The sulfonic acid-based monomer is particularly preferably a compound represented by the following formula (2) in terms of economic efficiency and structural stability. The compound can be obtained according to the method disclosed in JP 5558357 B, for example.

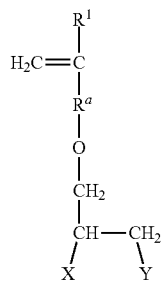

(2)

In the formula, $R^1$ represents a hydrogen atom or a CH$_3$ group; $R^a$ represents a CH$_2$ group, a CH$_2$CH$_2$ group, or a direct bond; and X and Y are the same as or different from each other and each represent a hydroxy group or a sulfonic acid (salt) group where one or both of X and Y represent a sulfonic acid (salt) group.

In the formula (2), $R^1$ represents a hydrogen atom or a CH$_3$ group, preferably a hydrogen atom; $R^a$ represents a CH$_2$ group, a CH$_2$CH$_2$ group, or a direct bond, preferably a CH$_2$ group. X and Y are the same as or different from each other and each represent a hydroxy group or a sulfonic acid (salt) group, and preferably, one of X and Y represents a sulfonic acid (salt) group, and the other represents a hydroxy group.

(ii) Cationic Monomer

The cationic monomer is a compound that contains an unsaturated double bond (carbon-carbon double bond) and a cationic group.

The phrase "contains . . . a cationic group" means that one or two or more cationic groups are contained in one molecule. Preferred examples of the cationic group include amino, ammonium, pyridyl, imino, hydrazide, and pyridinium groups. The cationic group may be in the form of a salt, and a cationic salt group is encompassed by the cationic group. In the present invention, preferred are an amino group, an ammonium group, and groups of salts thereof. More preferred are a secondary amino group, a tertiary amino group, a quaternary ammonium group, and groups of salts thereof.

Specific examples of the cation-based monomer include amines (primary amines, secondary amines, tertiary amines) and salts thereof and quaternary ammonium salts. Secondary amines and tertiary amines are preferred as amines. In particular, the cation-based monomer is preferably a compound represented by the following formula (3):

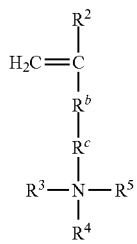

(3)

wherein $R^2$ represents a hydrogen atom or a CH$_3$ group; $R^b$ represents a CH$_2$ group, a CH$_2$CH$_2$ group, or a direct bond; $R^c$ represents —O—CH$_2$—CH(OH)—CH$_2$—, —O—CH$_2$—CH(CH$_2$OH)—, —O-(A$^1$O)$_m$—CH$_2$—CH(OH)—CH$_2$—, or —O-(A$^1$O)$_m$—CH$_2$—CH(CH$_2$OH)— where A$^1$Os are the same as or different from each other and each represent a C2-C18 oxyalkylene group and m is an average number of moles of an oxyalkylene group added represented by A$^1$O and is 1 to 300; and $R^3$, $R^4$, and $R^5$ are the same as or different from each other and each represent a hydrogen atom or a C1-C30 organic group where one of $R^3$, $R^4$, and $R^5$ may be absent.

In the formula (3), $R^2$ represents a hydrogen atom or a CH$_3$ group, preferably a hydrogen atom; and $R^b$ represents a CH$_2$ group, a CH$_2$CH$_2$ group, or a direct bond, preferably a CH$_2$ group.

$R^c$ represents —O—CH$_2$—CH(OH)—CH$_2$—, —O—CH$_2$—CH(CH$_2$OH)—, —O-(A$^1$O)$_m$—CH$_2$—CH(OH)—CH$_2$—, or —O-(A$^1$O)$_m$—CH$_2$—CH(CH$_2$OH)—. The number of carbon atoms of the oxyalkylene group represented by A$^1$O is preferably 2 to 8, more preferably 2 to 4, still more preferably 2. When the chain represented by -(A$^1$O)$_m$— is formed of two or more oxyalkylene groups, these oxyalkylene groups may be added randomly, in block, or alternately, for example.

The average number of repeating units (average number of moles added) m of A$^1$O is 1 to 300. In order to maintain the film strength and enhance the solubility, the average number of repeating units is more preferably 2 to 300, still more preferably 5 to 150, particularly preferably 10 to 100, most preferably 10 to 50.

$R^3$, $R^4$, and $R^5$ are the same as or different from each other and each represent a hydrogen atom or a C1-C30 organic group. The C1-C30 organic group may be, but is not limited to, an unsubstituted group or a group having a substituent. The number of carbon atoms of the organic group is preferably 1 to 20, more preferably 1 to 12, still more preferably 1 to 8, particularly preferably 1 to 4. Examples of the substituent include, but are not limited to, alkoxy, hydroxy, carboxyl, sulfonic acid, acyl, amide, ester, and ketone groups.

Specific examples of the C1-C30 organic group include alkyl groups such as methyl, ethyl, isopropyl, n-propyl, tertiary butyl, isobutyl, n-butyl, n-pentyl, n-hexyl, cyclohexyl, n-octyl, n-dodecyl, and hexadecyl groups; aryl groups such as phenyl and naphthyl groups; alkenyl groups such as ethylene, isopropylene, n-propylene, butylene, octylene, and nonylene groups; alkyl groups having a substituent, such as benzyl, phenethyl, methoxymethyl, and hydroxyethyl groups; and aryl groups having a substituent, such as methylphenyl, methoxyphenyl, 2,4-xylyl, and mesityl groups. $R^3$, $R^4$ and $R^5$ each preferably represent a hydrogen atom, an alkyl group, or an alkyl group having a substituent (preferably a hydroxy group).

One of $R^3$, $R^4$, and $R^5$ may be absent. In this case, the compound represented by the formula (3) is a tertiary amine.

When $R^3$, $R^4$, and $R^5$ are all present, that is, they are the same as or different from each other and each represent a hydrogen atom or a C1-C30 organic group, the compound represented by the formula (3) has a quaternized nitrogen atom. In the formula (3), a counter anion $Z^-$ is present in the vicinity of the quaternized nitrogen atom. The type of the counter anion $Z^-$ is preferably, but not limited to, a halide ion, an alkyl sulfuric acid ion, or an organic acid ion. Specific examples of the halide ion include chloride, bromide, iodide, and fluoride ions. Preferred among these are chloride, bromide, and iodide ions, and more preferred is a chloride ion.

Specific examples of the alkyl sulfuric acid ion include a methyl sulfuric acid ion and an ethyl sulfuric acid ion. Preferred is a methyl sulfuric acid ion.

The organic acid ion is preferably an acetic acid ion ($CH_3COO^-$) or a propionic acid ion ($CH_3CH_2COO^-$).

(iii) PAG-Based Monomer

The PAG-based monomer is a compound that contains an unsaturated double bond (carbon-carbon double bond) and a (poly)alkylene glycol group which means an alkylene glycol group or a polyalkylene glycol group.

The phrase "contains . . . a (poly)alkylene glycol group" means that one or two or more (poly)alkylene glycol groups are contained in one molecule. The (poly)alkylene glycol group is preferably formed by one or two or more C2-C18 oxyalkylene groups, for example. When two or more oxyalkylene groups are present, they may be added randomly, in block, or alternately, for example. The number of carbon atoms of the oxyalkylene group is more preferably 2 to 8, still more preferably 2 to 4, particularly preferably 2. The average number of repeating units (average number of moles added) of an oxyalkylene group (alkylene glycol) is preferably 1 to 300, for example. In order to enhance the solubility, the average number of repeating units is more preferably 2 to 300, still more preferably 5 to 150, particularly preferably 10 to 100, most preferably 10 to 50.

The PAG-based monomer is particularly preferably a compound represented by the following formula (4):

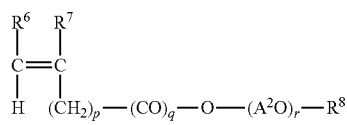

(4)

wherein $R^6$ and $R^7$ are the same as or different from each other and each represent a hydrogen atom or a methyl group; p represents an integer of 0 to 2; q represents 0 or 1; $A^2Os$ are the same as or different from each other and each represent a C2-C18 oxyalkylene group; r is the average number of moles of an oxyalkylene group added represented by $A^2O$ and is 1 to 300; and $R^8$ represents a hydrogen atom or a C1-C30 organic group.

In the formula (4), the number of carbon atoms of the oxyalkylene group represented by $A^2O$ is preferably 2 to 8, more preferably 2 to 4, still more preferably 2. When the chain represented by $-(A^2O)_r-$ is formed by two or more oxyalkylene groups, they may be added randomly, in block, or alternately, for example.

The average number of repeating units (average number of moles added) r of $A^2O$ is 1 to 300. In order to maintain the film strength and enhance the solubility, r is more preferably 2 to 300, still more preferably 5 to 150, particularly preferably 10 to 100, most preferably 10 to 50.

$R^6$ and $R^7$ may be the same as or different from each other, and each represent a hydrogen atom or a methyl group; and p is 0, 1, or 2. Thus, when q is 0, an alkenyl group represented by "$C(R^6)H=C(R^7)-(CH_2)_p-$" corresponds to a C2-C6 alkenyl group. The number of carbon atoms of the alkenyl group is preferably 3 to 5.

Specific examples of the alkenyl group represented by "$C(R^6)H=C(R^7)-(CH_2)_p-$" include a vinyl group, a 2-propenyl group, an allyl group, a methallyl group, a 3-butenyl group, and a 3-methyl-3-butenyl group. Preferred among these are a vinyl group, an allyl group, a methallyl group, and a 3-methyl-3-butenyl group.

For $R^6$ and $R^7$, it is particularly preferred that $R^6$ is a hydrogen atom and $R^7$ is a methyl group.

$R^8$ represents a hydrogen atom or a C1-C30 organic group. The C1-C30 organic group may be, but is not limited to, an unsubstituted group or a group having a substituent. For example, in order to enhance the solubility of the anionic group-containing polymer, the number of carbon atoms of the organic group is preferably 1 to 12, more preferably 1 to 8, still more preferably 1 to 4, particularly preferably 1 to 3. The substituent is preferably, but not limited to, a hydroxy group or a hydroxyalkyl group.

The C1-C30 organic group is preferably a hydrocarbon group or a hydrocarbon group containing a hydroxy group or a hydroxyalkyl group. Preferred examples of the hydrocarbon group include (linear, branched, or cyclic) alkyl, phenyl, alkyl-substituted phenyl, alkenyl, alkynyl, and aryl groups. More preferred among these is a (linear, branched, or cyclic) alkyl group. Thus, a particularly preferred C1-C30 organic group is an alkyl group, an alkyl group containing a hydroxy group, or an alkyl group containing a hydroxyalkyl group (particularly preferably, a hydroxymethyl group represented by —$CH_2OH$).

$R^8$ is particularly preferably a hydrogen atom, a C1-C3 linear or branched alkyl group, or a C3 alicyclic alkyl group, most preferably a hydrogen atom, a methyl group, or an ethyl group.

The subscript q represents 0 or 1. When q is 0, the compound represented by the formula (4) is a monomer having an ether structure (also referred to as unsaturated (poly)alkylene glycol ether-based monomer). When q is 1, the compound represented by the formula (4) is a monomer having an ester structure (also referred to as unsaturated (poly)alkylene glycol ester-based monomer). In particular, the case where q is 0, that is, an unsaturated (poly)alkylene glycol ether-based monomer is preferred.

The unsaturated (poly)alkylene glycol ether-based monomer is preferably an unsaturated alcohol (poly)alkylene glycol adduct. Preferred specific examples thereof include alkylene oxide adducts of vinyl alcohol, alkylene oxide adducts of (meth)allyl alcohol, alkylene oxide adducts of 3-buten-1-ol, alkylene oxide adducts of isoprenol(3-methyl-3-buten-1-ol), alkylene oxide adducts of 3-methyl-2-buten-1-ol, alkylene oxide adducts of 2-methyl-3-buten-2-ol, alkylene oxide adducts of 2-methyl-2-buten-1-ol, and alkylene oxide adducts of 2-methyl-3-buten-1-ol.

The unsaturated (poly)alkylene glycol ester-based monomer is preferably an unsaturated carboxylic acid (poly)alkylene glycol ester-based compound. More preferred are an (alkoxy)(poly)alkylene glycol mono(meth)acrylate and a (hydroxy)(poly)alkylene glycol mono(meth)acrylate. Still more preferred are alkoxy (poly)ethylene glycol mono (meth)acrylate and hydroxy (poly)ethylene glycol mono (meth)acrylate.

(iv) Hydrophobic Group-Containing Monomer

The hydrophobic group-containing monomer is a compound that contains an unsaturated double bond (carbon-carbon double bond) and a hydrophobic group.

The phrase "contains . . . a hydrophobic group" means that one or two or more hydrophobic groups are contained in one molecule. The hydrophobic group is preferably, but not limited to, a hydrocarbon group, for example. Specific examples thereof include alkyl, alkenyl, alkynyl, cycloalkyl, and aryl groups. Preferred among these are alkyl, alkenyl, and aryl groups, more preferred are alkyl and alkenyl groups, still more preferred is an alkyl group, and particularly preferred is a linear alkyl group. The number of carbon atoms of the hydrocarbon group is preferably 1 to 30, more preferably 2 to 20, still more preferably 3 to 12, particularly preferably 4 to 10, most preferably 4 to 6 in terms of hydrophobicity and polymerizability.

The hydrophobic group may optionally contain a heteroatom as long as the hydrophobic group has hydrophobicity, and may be a group in which a hydrogen atom of the hydrocarbon group is replaced with halogen, for example.

Specific examples of the hydrophobic group-containing monomer include (meth)acrylic acid alkyl ester-based monomers such as butyl (meth)acrylate, 2-ethylhexyl (meth)acrylate, and dodecyl (meth)acrylate; vinyl aryl monomers such as styrene, indene, and vinyl aniline; and compounds represented by the following formula (5). In particular, preferred are the compounds represented by the formula (5):

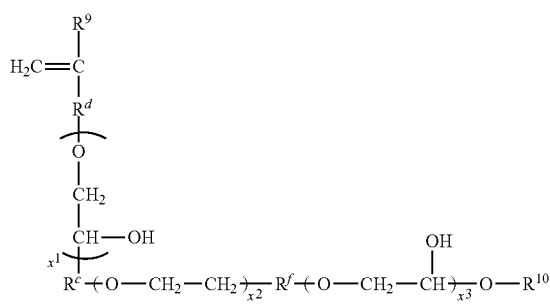

(5)

wherein $R^9$ represents a hydrogen atom or a $CH_3$ group; $R^d$, $R^e$, and $R^f$ are the same as or different from each other and each represent a $CH_2$ group, a $CH_2CH_2$ group, or a direct bond; $x^1$ represents the number of units represented by (O—$CH_2$—CH(OH)) and is 0 or 1; $x^2$ represents the number of units represented by (O—$CH_2$—$CH_2$) and is 0 to 100; $x^3$ represents the number of units represented by (O—$CH_2$—CH(OH)) and is 0 or 1, where $x^2$ is 1 to 100 and $x^3$ is 1 when $R^d$, $R^e$, and $R^f$ each represent a direct bond and $x^1$ is 0; and $R^{10}$ represents a hydrophobic group.

In the formula (5), $R^9$ represents a hydrogen atom or a $CH_3$ group, preferably a hydrogen atom; and $R^d$, $R^e$, and $R^f$ are the same as or different from each other and each represent a $CH_2$ group, a $CH_2CH_2$ group, or a direct bond, and preferably, $R^d$ and $R^e$ each represent a $CH_2$ group and $R^f$ represents a direct bond. The hydrophobic group represented by $R^{10}$ is as described above, and is preferably a C1-C30 hydrocarbon group.

The symbol $x^1$ represents the number of units represented by (O—$CH_2$—CH(OH)) and is 0 or 1. The symbol $x^1$ is preferably 1. Thus, the hydrophilicity of the hydrophobic group-containing monomer is more enhanced. Therefore, even if the proportion of the monomer in the monomer component is increased, the polymerization reaction is more sufficiently carried out. The structure represented by (O—$CH_2$—CH(OH)) may be formed by reacting a glycidyl group with a hydroxy group of, for example, an alcohol or an alkylene oxide adduct.

The symbol $x^2$ represents the number of units represented by (O—$CH_2$—$CH_2$) and is 0 to 100 ($x^2$ is 1 to 100 when $R^d$, $R^e$, and $R^f$ each represent a direct bond and $x^1$ is 0). When $x^2$ is 1 to 100, the monomer has more enhanced hydrophilicity, and is therefore readily copolymerized even when a hydrophilic solvent such as water is used. In particular, $x^2$ is preferably 1 to 50. When $x^2$ is 0, the effects of the hydrophobic group represented by $R^{10}$ can be more sufficiently achieved. In terms of the hydrophobicity of the resulting copolymer, the symbol $x^2$ is more preferably 0. Thus, the $x^2$ value is preferably controlled in consideration of the balance between the hydrophilicity and the hydrophobicity.

The symbol $x^3$ represents the number of units represented by (O—$CH_2$—CH(OH)) and is 0 or 1 ($x^3$ is 1 when $R^d$, $R^e$, and $R^f$ each represent a direct bond and $x^1$ is 0). The symbol $x^3$ is preferably 0.

Examples of the hydrophobic group-containing monomer represented by the formula (5) include compounds prepared by reacting an unsaturated double bond-containing alcohol (e.g. vinyl alcohol, allyl alcohol, or isoprenol) with a C1-C30 (most preferably C4-C6) alkyl glycidyl ether; compounds prepared by reacting an ethylene oxide adduct of an unsaturated double bond-containing alcohol with a C1-C30 (most preferably C4-C6) halogenated alkyl; C1-C30 alkyl glycidyl ethers; and compounds prepared by reacting an allyl glycidyl ether with a C1-C30 (most preferably C4-C6) alcohol or an ethylene oxide adduct of a C1-C30 (most preferably C4-C6) alcohol.

The hydrophobic group-containing monomer is particularly preferably a compound represented by the following formula (6). The symbols in the formula are as described above, and $R^9$ is preferably a hydrogen atom and $R^d$ is preferably a $CH_2$ group.

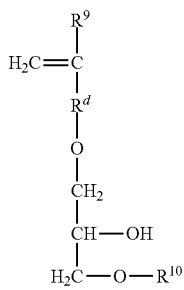

(6)

Here, obviously, the above-described (poly)alkylene glycol group-containing monomer may further contain a hydrophobic group, and the hydrophobic group-containing monomer may further contain a (poly)alkylene glycol group. Such compounds, that is, such monomers containing a hydrophobic group and a (poly)alkylene glycol are particularly preferably a compound represented by the following formula (7). A polymer prepared using such a compound has a structure in which a hydrophobic group represented by —$R^{14}$ or —W—$Y^a$—$R^{14}$ and a hydrophilic group represented by —O—($X^a$)m-Z as a (poly)alkylene glycol chain are branched, and the hydrophobic group and the hydrophilic group can act on a variety of stains such as hydrophilic stains and hydrophobic stains at the same time. Therefore, the anti-redeposition properties are further enhanced.

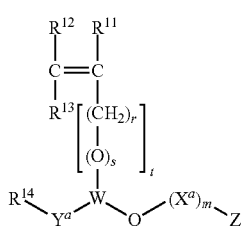

(7)

In the formula, $R^{11}$, $R^{12}$, and $R^{13}$ are the same as or different from each other and each represent a hydrogen atom or a methyl group; $R^{14}$ represents a hydrogen atom or a C1-C30 chain hydrocarbon group; r is an integer of 0 to 2; s is an integer of 0 or 1; t is an integer of 0 to 2; W represents a C6-C30 trivalent aromatic group or a trivalent group having a structure in which three hydrogen atoms are removed from a C1-C30 chain hydrocarbon; Z represents a hydrogen atom or a group represented by $SO_3D$ in which D represents a hydrogen atom, a metal atom, $NH_4$, or an organic amine salt; $Y^a$ represents a direct bond or an oxygen atom; $X^a$s are the same as or different from each other and each represent a C2-C20 oxyalkylene group; and m is an integer of 1 to 200, where when $R^{14}$ is a hydrogen atom, $Y^a$ is a direct bond, and when W is a trivalent group having a structure in which three hydrogen atoms are removed from a C1-C30 chain hydrocarbon, $R^{14}$ is a C1-C30 chain hydrocarbon group.

Regarding $R^{11}$, $R^{12}$, and $R^{13}$ in the formula (7) which are the same as or different from each other and each represent a hydrogen atom or a methyl group, when W is a C6-C30 trivalent aromatic group, it is preferred that $R^{11}$ and $R^{13}$ are hydrogen atoms and $R^{12}$ is a methyl group, or when W is a trivalent group having a structure in which three hydrogen atoms are removed from a C1-C30 chain hydrocarbon, $R^{11}$, $R^{12}$, and $R^{13}$ are all preferably hydrogen atoms. In these cases, the polymerizability with an anionic group-containing monomer such as a carboxylic acid-based monomer is further enhanced.

Regarding r, s, and t, when W in the formula (7) is a C6-C30 trivalent aromatic group, r is preferably an integer of 0 or 1, s is preferably an integer of 0 or 1, and t is preferably an integer of 0 or 1. More preferably, r, s, and t satisfy r=s=t=0. When W is a trivalent group having a structure in which three hydrogen atoms are removed from a C1-C30 chain hydrocarbon, r is preferably an integer of 0 or 1, s is preferably an integer of 0 or 1, t is preferably an integer of 0 or 1. More preferably, r, s, and t satisfy r=s=t=1.

W represents a C6-C30 trivalent aromatic group or a trivalent group having a structure in which three hydrogen atoms are removed from a C1-C30 chain hydrocarbon. The C6-C30 trivalent aromatic group is not limited as long as it has an aromatic ring. The number of carbon atoms of the trivalent aromatic group is preferably 6 to 14, more preferably 6 to 10. Examples of the aromatic ring include a benzene ring, a naphthalene ring, and an anthracene ring. Preferred among these is a benzene ring. The trivalent chain hydrocarbon group having a structure in which three hydrogen atoms are removed from a chain hydrocarbon may be, but is not limited to, a saturated chain hydrocarbon or an unsaturated chain hydrocarbon. The chain hydrocarbon may have a branch. The number of carbon atoms of the chain hydrocarbon is preferably 1 to 30, more preferably 1 to 5, still more preferably 1 to 3. Specific examples of the chain hydrocarbon include alkanes, alkenes, and alkynes. Preferred are alkanes. When the trivalent group having a structure in which three hydrogen atoms are removed from a chain hydrocarbon has a branch, the number of carbon atoms of the trivalent group having a structure in which three hydrogen atoms are removed from a chain hydrocarbon means the total number of carbon atoms of the main chain and a branched chain(s).

$Y^a$ represents a direct bond or an oxygen atom (when $R^{14}$ is a hydrogen atom, $Y^a$ is a direct bond). When W is a trivalent group having a structure in which three hydrogen atoms are removed from a chain hydrocarbon, $Y^a$ is preferably an oxygen atom. When $Y^a$ is an oxygen atom, the polymer has more sufficient water-solubility, and the properties such as clay dispersibility are enhanced.

$R^{14}$ represents a hydrogen atom or a C1-C30 chain hydrocarbon group (when W is a trivalent group having a structure in which three hydrogen atoms are removed from a C1-C30 chain hydrocarbon, $R^{14}$ is a C1-C30 chain hydrocarbon group). $R^{14}$ is preferably a C1-C30 chain hydrocarbon group. Specific examples thereof include alkyl, alkenyl, and alkynyl groups, each of which may optionally have a branch. Preferred among these are alkenyl and alkyl groups. More preferred is an alkyl group. In order to enhance the carbon black dispersibility, anti-redeposition properties, and clay dispersibility, the number of carbon atoms of the chain hydrocarbon group is preferably 3 to 25, more preferably 5 to 20, still more preferably 7 to 15. When the chain hydrocarbon group has a branch, the number of carbon atoms of the chain hydrocarbon group means the total number of carbon atoms of the main chain and a branched chain(s).

$X^a$s are the same as or different from each other and each represent a C2-C20 oxyalkylene group. In order to enhance the hydrophilicity and the anti-redeposition properties, the number of carbon atoms of the oxyalkylene group is preferably 2 to 10, more preferably 2 to 5, still more preferably 2 to 3, most preferably 2. The average number of repeating units m of the oxyalkylene group represented by $X^a$ is an integer of 1 to 200. In order to enhance the clay dispersibility and the carbon black dispersibility, m is preferably 2 to 100, more preferably 3 to 70, still more preferably 5 to 50, most preferably 5 to 30.

Z represents a hydrogen atom or a group represented by $SO_3D$ in which D represents a hydrogen atom, a metal atom, $NH_4$, or an organic amine salt. In this case, sufficient water solubility is obtained and the clay dispersibility and the anti-redeposition properties are sufficiently exerted. Examples of the metal atom represented by D include alkali metals such as Li, Na, and K. D is preferably $NH_4$.

The monomer represented by the formula (7) is particularly preferably a compound represented by the following formula (8) or (9):

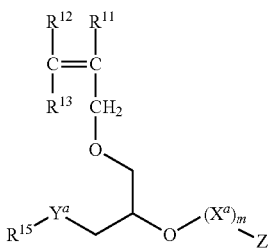

(8)

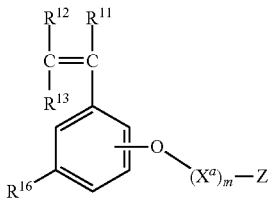

(9)

wherein $R^{11}$, $R^{12}$, $R^{13}$, Z, $X^a$, $Y^a$, and m are the same as those in the formula (7); $R''$ is a C1-C30 chain hydrocarbon group; $R^{16}$ represents a hydrogen atom or a C1-C30 chain hydrocarbon group.

In formula (9), a —O—$(X^a)$m-Z group is bonded to any one of ortho-, meta-, and para-positions to —$R^{16}$ in the benzene ring.

Specific and preferred examples of Z, $X^a$, $Y^a$, and m in the formulas (8) and (9) are the same as those in the formula (7). Regarding $R^{11}$, $R^{12}$, and $R''$, in order to enhance the polymerizability with an anionic group-containing monomer such as a carboxylic acid-based monomer, $R^{11}$, $R^{12}$, and $R''$ in the formula (8) are all preferably hydrogen atoms, and $R^{11}$ and $R^{13}$ in the formula (9) are preferably hydrogen atoms and $R^{12}$ is preferably a methyl group.

$R^{15}$ in the formula (8) represents a C1-C30 chain hydrocarbon group. The chain hydrocarbon group may be as described for $R^{14}$ in the formula (7). Specifically, the chain hydrocarbon group is preferably an alkenyl group or an alkyl group, more preferably an alkyl group. In order to enhance the carbon black dispersibility, anti-redeposition properties, and clay dispersibility, the number of carbon atoms of the chain hydrocarbon group is preferably 5 to 25, more preferably 7 to 20, still more preferably 9 to 15.

$R^{16}$ in the formula (9) represents a hydrogen atom or a C1-C30 chain hydrocarbon group. The chain hydrocarbon group may be as described for $R^{14}$ in the formula (7). Specifically, the chain hydrocarbon group is preferably an alkenyl group or an alkyl group, more preferably an alkyl group. In order to enhance the carbon black dispersibility, anti-redeposition properties, and clay dispersibility, the number of carbon atoms of the chain hydrocarbon group is preferably 3 to 25, more preferably 5 to 20, still more preferably 7 to 15.

Here, when the number of carbon atoms of each of $R^{15}$ in the formula (8) and $R^{16}$ in the formula (9) is as small as 1 to 3, for example, the hydrophobic degree and the hydrophilic degree can be controlled by reducing the number of repeating units m of the oxyalkylene group. Therefore, the carbon black dispersibility and anti-redeposition properties are not necessarily lowered when the number of carbon atoms is small. On the other hand, when the number of carbon atoms is as large as 28 to 30, the hydrophobic degree and the hydrophilic degree can be controlled by increasing the number of repeating units m of the oxyalkylene group. Therefore, the carbon black dispersibility and anti-redeposition properties are not necessarily lowered when the number of carbon atoms is large.

In order to enhance the polymerizability with an anionic group-containing monomer such as an carboxylic acid-based monomer, $R^{12}$ and the phenyl group in the formula (9) are preferably in trans position to form an E-isomer (trans position). Further, the —O—$(X^a)$m-Z group has only to be bonded to any one of ortho-, meta-, and para-positions to —$R^{16}$ in the benzene ring, and is preferably bonded to the para-position. The —O—$(X^a)$m-Z group is preferably bonded to the ortho-position to the carbon to which a polymerizable unsaturated group is bonded in the benzene ring in the formula.

Examples of the compound represented by the formula (8) include ADEKA-REASOAP SR series (produced by ADEKA, ether sulfate type ammonium salt; "Surfactants", Products List of ADEKA, Y01-1012A, No. 6-2) and ADEKA-REASOAP ER series (produced by ADEKA, non-ionic type; "Surfactants", Products List of ADEKA, Y01-1012A No. 6-2), which are function-imparting surfactants and surfactants for water-based resins; and AQUALON KH series (produced by Dai-Ichi Kogyo Seiyaku Co., Ltd., ammonium polyoxyethylene-1-(allyloxymethyl)alkyl ether sulfate). Specifically, ADEKA-REASOAP SR series includes SR-10 (EO 10 mol), SR-20 (EO 20 mol), and SR-3025 (EO 30 mol, 25% aqueous solution); ADEKA-REASOAP ER series includes ER-10 (EO 10 mol), ER-20 (EO 20 mol), ER-30 (EO 30 mol), and ER-40 (EO 40 mol); and AQUALON KH series includes AQUALON KH-05 (EO 5 mol) and AQUALON KH-10 (EO 10 mol). More preferred are SR-10, SR-20, and ER-20 (ADEKA-REASOAP), and KH-10.

Examples of the compound represented by the formula (9) include AQUALON HS/BC series (produced by Dai-Ichi Kogyo Seiyaku Co., Ltd., ammonium polyoxyethylene nonyl propenyl phenyl ether sulfate) and AQUALON RN series (produced by Dai-Ichi Kogyo Seiyaku Co., Ltd., polyoxyethylene nonyl propenyl phenyl ether). Specifically, AQUALON HS/BC series includes HS-10 (EO 10 mol), BC-0515 (EO 5 mol), BC-10 (EO 10 mol), and BC-20 (EO 20 mol) and AQUALON RN series includes RN-20 (EO 20 mol), RN-30 (EO 30 mol), and RN-50 (EO 50 mol). More preferred are AQUALON BC-10, BC-20, RN-20, and RN-30.

(v) Lactam Group-Containing Monomer

The lactam group-containing monomer is a compound that contains an unsaturated double bond (carbon-carbon double bond) and a lactam group.

The phrase "contains . . . a lactam group" means that one or two or more lactam groups are contained in one molecule.

The lactam group is preferably, but not limited to, an α-lactam, β-lactam, γ-lactam, or σ-lactam group, for example. Preferred among these is a γ-lactam group (pyrrolidone group).

Specific examples of the lactam group-containing monomer include N-vinylpyrrolidone, N-vinylcaprolactam, N-vinyl-4-butylpyrrolidone, N-vinyl-4-propylpyrrolidone, N-vinyl-4-ethylpyrrolidone, N-vinyl-4-methylpyrrolidone, N-vinyl-4-methyl-5-ethylpyrrolidone, N-vinyl-4-methyl-5-propylpyrrolidone, N-vinyl-5-methyl-5-ethylpyrrolidone, N-vinyl-5-propylpyrrolidone, N-vinyl-5-butylpyrrolidone, N-vinyl-4-methylcaprolactam, N-vinyl-6-methylcaprolactam, N-vinyl-6-propylcaprolactam, and N-vinyl-7-butylcaprolactam. Particularly preferred among these is N-vinylpyrrolidone.

<Different Component>

The water-soluble film may optionally contain one or two or more components other than the water-soluble resin and the anionic group-containing polymer (also referred to as a different component), as needed. Examples of the different component include, but are not limited to, various additives. The water-soluble film may contain an acrylic acid homopolymer as long as the effects of the present invention are not impaired.

The amount of the different component is preferably 0% to 20% by mass, more preferably 1% to 10% by mass of 100% by mass of the water-soluble film of the present invention.

[Method for Producing Water-Soluble Film]

The water-soluble film of the present invention is preferably produced by a production method including a step of polymerizing a monomer component including an anionic group-containing monomer (also referred to as a polymerization step). The present invention also relates to such a production method. In particular, the production method more preferably further includes a step of mixing an anionic group-containing polymer obtained in the polymerization step and a water-soluble resin (also referred to as a mixing step). The production method preferably further includes a film-forming step, and may include one or two or more other steps applicable to usual preparation of films.

The following further describes the respective steps.

<Polymerization Step>

The polymerization step is a step of polymerizing a monomer component including an anionic group-containing monomer. Examples of the step include a step of polymerizing one or two or more anionic group-containing monomers; a step of copolymerizing a monomer component including one or two or more anionic group-containing monomers and one or two or more different monomers; and a step of graft-polymerizing a monomer component including an anionic group-containing monomer onto a polymer prepared by polymerizing a monomer component including a different monomer.

The different monomer to be used is preferably at least a monomer having at least one group selected from the group consisting of sulfonic acid (salt) groups, cationic groups, (poly)alkylene glycol groups, hydrophobic groups, and lactam groups. The use thereof further enhances the hard-water resistance and the solubility in cold water of the water-soluble film, and further suppresses a reduction of the film strength. As a result, the effects of the present invention can be more sufficiently exhibited. It is a preferred embodiment of the present invention that the monomer component includes a monomer having at least one group selected from the group consisting of sulfonic acid (salt) groups, cationic groups, (poly)alkylene glycol groups, hydrophobic groups, and lactam groups in addition to the anionic group-containing monomer.

The monomer having at least one group selected from the group consisting of sulfonic acid (salt) groups, cationic groups, (poly)alkylene glycol groups, hydrophobic groups, and lactam groups is preferably at least one selected from the group consisting of sulfonic acid (salt) group-containing monomers, cationic group-containing monomers, (poly)alkylene glycol group-containing monomers, hydrophobic group-containing monomers, and lactam group-containing monomers.

The details of the anionic group-containing monomer and such different monomers are as described above.

When the polymerization step is a step of copolymerizing a monomer component including an anionic group-containing monomer (A) and a different monomer (B), the mass ratio between the monomers (A/B) is preferably (1 to 99)/(99 to 1), for example. In terms of the balance between the film strength and the water solubility, the mass ratio is more preferably (5 to 95)/(95 to 5), still more preferably (10 to 90)/(90 to 10).

The proportion of the monomer having at least one group selected from the group consisting of sulfonic acid (salt) groups, cationic groups, (poly)alkylene glycol groups, hydrophobic groups, and lactam groups in the different monomer (B) is preferably 50% to 100% by mass of 100% by mass of the total amount of the different monomer (B). The proportion is more preferably 70% by mass or more, still more preferably 90% by mass or more.

The graft polymerization step as a copolymerization step is preferably a step of graft-polymerizing an anionic group-containing monomer onto a polymer prepared by polymerizing a different monomer. Preferred examples of the polymer prepared by polymerizing a different monomer include polyalkylene glycols such as polyethylene glycol; polymers having a hydrophobic group or a lactam group at an end of a polyalkylene glycol such as polyethylene glycol; and polymers of a monomer having a lactam structure, such as polyvinyl pyrrolidone. In this case, the graft polymerization step is preferably a step of polymerizing an anionic group-containing monomer onto a polyalkylene glycol while hydrogen atoms are drawn using a polymerization initiator such as a peroxide or a persulfate.

The amount of the anionic group-containing monomer as a graft component is preferably 5 to 100 parts by weight, more preferably 9 to 70 parts by weight relative to 100 parts by weight of the polymer prepared by polymerizing the different monomer.

The polymerization step may be performed by a usual method such as solution polymerization or bulk polymerization. In particular, solution polymerization is preferred.

The solution polymerization may be performed in a batch mode or a continuous mode. Examples of the solvent to be used in the solution polymerization include water; alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; ketone compounds such as acetone and methyl ethyl ketone; and cyclic ether compounds such as tetrahydrofuran and dioxane. One or two or more of these may be used. In terms of the solubilities of the starting material component and the resulting polymer, at least one selected from the group consisting of water and C1-C4 lower alcohols is preferably used.

When aqueous solution polymerization is performed, one or two or more water-soluble polymerization initiators are preferably used as a radical polymerization initiator. Preferred examples of the initiator include persulfates such as ammonium persulfate, sodium persulfate, and potassium persulfate; hydrogen peroxide; and water-soluble azo initiators such as azoamidine compounds (e.g. a 2,2'-azobis-2-methyl propion amidine hydrochloric acid salt), cyclic azoamidine compounds (e.g. a 2,2'-azobis-2-(2-imidazolin-2-yl) propane hydrochloric acid salt), and azonitrile compounds (e.g. 2-carbamoyl azoisobutyronitrile). In this case, one or two or more accelerators may also be used, as needed. Examples thereof include alkali metal sulfites such as sodium bisulfite, metadisulfite, sodium hypophosphite, Fe(II) salts such as Mohr's salt, sodium hydroxymethanesulfinate dihydrate, hydroxylamine hydrochloric acid salt, thiourea, L-ascorbic acid (salt), and erythorbic acid (salt).

When bulk polymerization is performed and when solution polymerization is performed using a lower alcohol, an aromatic hydrocarbon, an aliphatic hydrocarbon, an ester compound, or a ketone compound as a solvent, a radical polymerization initiator is preferably used. Examples thereof include peroxides such as benzoyl peroxide, lauroyl peroxide, sodium peroxide, di-t-butylperoxide, t-butylperoxy benzoate, and t-butylperoxy isocarbonate; hydroperoxides such as t-butyl hydroperoxide and cumene hydroperoxide; and azo compounds such as azobisisobutyronitrile. In this case, an accelerator such as a metal or an amine compound may be used in combination therewith.

When a solvent mixture of water and a lower alcohol is used, any of the above various radical polymerization initiators or any combination of the radical polymerization initiators and the accelerators may appropriately be used.

The reaction temperature of the polymerization step is preferably set to fall within the range of, but not limited to, 30° C. or higher and not higher than the boiling point of the monomer, more preferably 45° C. to 200° C., still more preferably 60° C. to 200° C., particularly preferably 80° C. to 150° C., for example. The reaction time (polymerization time) is preferably, but not limited to, 5 minutes to 10 hours, more preferably 30 minutes to 6 hours, for example, in view of the polymerization rate and the productivity.

In the polymerization step, the polymerization initiator and the monomer component may be added to a reaction vessel by any method. The total amount of each may be added at the initial stage or may be added dropwise into a reaction vessel, or part of each may be added at the initial stage and the remaining portion may be added dropwise.

In the polymerization step, the total amount of the monomer component is preferably 10% to 99% by mass of 100% by mass of the total amount of all the materials including a different material and a polymerization solvent. In the polymerization reaction using such an amount, the polymerization rate and the productivity can be more enhanced. The total amount of the monomer component is more preferably 20% to 98% by mass, still more preferably 30% to 80% by mass.

<Mixing Step>

The mixing step is a step of mixing an anionic group-containing polymer obtained in the above polymerization step and a water-soluble resin (particularly preferably polyvinyl alcohol-based polymer). In the mixing step, a different component may be further mixed therewith, as needed. These components may be mixed all at once, or after part of components to be mixed is mixed, the remaining portion may be mixed therewith.

In the mixing step, the anionic group-containing polymer, the water-soluble resin, and optionally the different component may be mixed by any means. For example, they may be dissolved or dispersed in a solvent or may be melt-kneaded, for example. When a solvent is used, the solvent may be, but not limited to, water, an organic solvent, or a solvent mixture of water and an organic solvent. Examples of the organic solvent include, but are not limited to, dimethyl sulfoxide, dimethylformamide, dimethylacetamide, methanol, ethanol, n-propanol, propanol, phenol, ethylene glycol, propylene glycol, n-butanol, toluene, xylene, ethyl acetate, n-propyl acetate, n-butyl acetate, isobutyl acetate, n-amyl acetate, tetrahydrofuran, dioxane, dimethyl acetamide, chloroform, acetone, methyl ethyl ketone, methyl isobutyl ketone, cyclohexanone, ethylene glycol monomethyl ether, propylene glycol monomethyl ether, propylene glycol monoethyl ether, propylene glycol tertially butyl ether, 3-methyl-3-methoxy butanol, dipropylene glycol monomethyl ether, ethylene glycol monomethyl ether, ethylene glycol monoethyl ether, ethylene glycol monobutyl ether, diethylene glycol monoethyl ether, and diethylene glycol monobutyl ether. Preferred among these is water.

The mixing step is preferably performed at a temperature of 20° C. to 90° C. In such a mixing step, the anionic group-containing polymer and the water-soluble resin (preferably polyvinyl alcohol-based polymer) are more sufficiently mixed. Thus, a more highly uniform water-soluble film can be obtained. The temperature is more preferably 50° C. to 90° C.

<Film-Forming Step>

The film-forming step is a step of forming a film using a mixture obtained in the mixing step. The film may be formed by any means, for example, by a method in which the mixture is applied to a base material, dried or hardened, and as needed, peeled from the base material (referred to as an application method or a coating method), a method in which a film formed from the mixture is thermocompression-bonded to a support, a kneading method, a T-die method, or an inflation method.

[Uses]

The water-soluble film of the present invention has an excellent solubility in cold water, high strength, excellent hard-water resistance, and chemical resistance. Therefore, the water-soluble film is particularly useful as packaging materials for chemicals such as agrochemicals or detergents. That is, the water-soluble film of the present invention is preferably used to package a chemical and/or a detergent. Further, the water-soluble film of the present invention is preferably one suitable for packaging a chemical and/or a detergent. An object to be packaged (e.g. chemicals) may be in any form (e.g. powder, granules, liquid) and may have any size or any particle size distribution. For example, the detergent may be any of powder detergents, liquid detergents, and gel detergents. Further, an object to be packaged may optionally contain any additive such as a dispersant, a bonding agent, or a surfactant, as needed. The water-soluble film of the present invention further functions as a builder that has excellent anti-soil redeposition properties and excellent detergency, and is therefore particularly useful as packaging materials for detergents.

<Composition>

Another aspect of the present invention relates to a composition (mixture) containing an anionic group-containing polymer and a water-soluble resin. The water-soluble film of the present invention can be favorably obtained by forming the composition into a film. The composition can be obtained by mixing an anionic group-containing polymer and a water-soluble resin (preferably polyvinyl alcohol-based polymer).

<Packaged Product>

Another aspect of the present invention relates to a packaged product including the water-soluble film of the present invention and a chemical and/or a detergent packaged in the water-soluble film. The packaged product of the present invention is, for example, a packaged product that includes a water-soluble film containing an anionic group-containing polymer and a water-soluble resin (preferably polyvinyl alcohol-based polymer) and a chemical and/or a detergent packaged in the water-soluble film. The forms and sizes of the packaged product and the chemical and/or the detergent in the packaged product are not limited, and may be appropriately designed. The form of the package may be a hermetically sealed package or a non-hermetically sealed package. In order to more readily and safely use a packaged product, a hermetically sealed package is preferred, for example.

<Method for Producing Packaged Product>

Another aspect of the present invention relates to a method for producing a packaged product including packaging a chemical and/or a detergent with the water-soluble film of the present invention. The method for producing a packaged product of the present invention is, for example, a water-soluble film production method that includes a step of mixing an anionic group-containing polymer and a water-soluble resin (preferably polyvinyl alcohol-based polymer), a step of forming a film using a mixture obtained in the mixing step, and a step of packaging a chemical and/or a detergent with the water-soluble film obtained in the film-forming step.

<Packaging Method, Etc.>

Another aspect of the present invention relates to a packaging method including packaging a chemical and/or a detergent with the water-soluble film of the present invention. The packaging method of the present invention is, for example, a packaging method that includes a step of mixing an anionic group-containing polymer and a water-soluble resin (preferably polyvinyl alcohol-based polymer), a step of forming a film using a mixture obtained in the mixing step, and a step of packaging a chemical and/or a detergent with the water-soluble film obtained in the film-forming step. The present invention also relates to a method for using a water-soluble film of the present invention, including a step of packaging a chemical and/or a detergent with the water-soluble film of the present invention. The using method of the present invention is, for example, a method for using a water-soluble film, including a step of mixing an anionic group-containing polymer and a water-soluble resin (preferably polyvinyl alcohol-based polymer), a step of forming a film using a mixture obtained in the mixing step, and packaging a chemical and/or a detergent with the water-soluble film obtained in the film-forming step.

EXAMPLES

The present invention is described in more detail below with reference to the examples, but the present invention is not limited to only these examples. Unless otherwise stated, "%" means "% by mass". In the following Examples and Comparative Examples, the polyvinyl alcohol-based polymer (PVA) is also simply referred to as a polyvinyl alcohol. The weight average molecular weight was determined by GPC analysis under any of the following measurement conditions.

<Conditions 1 for GPC (Measurement Conditions of Weight Average Molecular Weight)>
Apparatus: High-performance GPC apparatus (HLC-8320GPC) produced by Tosoh Corporation
Detector: RI
Columns: SHODEX Asahipak GF-310-HQ, GF-710-HQ, and GF-1G 7B produced by Showa Denko K.K.
Column temperature: 40° C.
Flow rate: 0.5 ml/min
Calibration curve: POLYACRYLIC ACID STANDARD produced by Sowa Kagaku Co., Ltd.
Eluent: 0.1 N sodium acetate/acetonitrile=3/1 (mass ratio)
<Conditions 2 for GPC (Measurement Conditions of Weight Average Molecular Weight and Number Average Molecular Weight)>

The weight average molecular weight and the number average molecular weight of a copolymer were measured by gel permeation chromatography under the following conditions.
Apparatus: HLC-8320GPC produced by Tosoh Corporation
Detector: RI
Columns: Shodex Asahipak GF-310-HQ, GF-710-HQ, and GF-1G produced by Showa Denko K.K.
Column temperature: 40° C.
Flow rate: 0.5 ml/min
Calibration curve: POLYACRYLIC ACID STANDARD produced by Sowa Kagaku Co., Ltd.
Eluent: a 0.1 N aqueous solution of sodium acetate
<Conditions 3 for GPC (Measurement Conditions of Weight Average Molecular Weight)>
Apparatus: HLC-8320GPC produced by Tosoh Corporation
Detector: RI
Column: one TSK-guard column and two TSK-GEL G3000PWXL columns (three columns in total) produced by Tosoh Corporation connected in series
Column temperature: 35° C.
Flow rate: 0.5 ml/min
Calibration curve: POLY SODIUM ACRYLATE STANDARD produced by Sowa Kagaku Co., Ltd.
Eluent: a dilution prepared by diluting a mixture of sodium dihydrogenphosphate dodecahydrate/disodium hydrogenphosphate dihydrate (34.5 g/46.2 g) with 5000 g of pure water
Calibration curve: POLYACRYLIC ACID STANDARD produced by American Polymer Standard Corp.

Synthesis of Anionic Group-Containing Polymer

Synthesis Example 1 (Polymer Composition 1)

1) Polymerization

A 2.5-L SUS316 vessel equipped with a thermometer, a reflux condenser, and a stirrer was charged with 180.0 g of pure water and 0.019 g of Mohr's salt (3 ppm in terms of the mass of iron (II) based on the total prepared amount, which refers to the weight of all the materials added including a material added in a neutralization step after completion of the polymerization), and they were heated to 85° C. under stirring (initial preparation).

Subsequently, 252.0 g of a 80% by mass aqueous solution of acrylic acid (hereinafter, also referred to as "80% AA"), 336.0 g of an EO adduct of 60% by mass isoprenol (the average number of moles added was 50, hereinafter, also referred to as "60% IPN50"), 44.3 g of a 15% by mass aqueous solution of sodium persulfate (hereinafter, referred to as "15% NaPS"), 16.5 g of a 35% by mass aqueous solution of sodium bisulfite (hereinafter, referred to as "35% SBS"), and 10.0 g of pure water were added dropwise through different dropping nozzles to the polymerization reaction system having a constant temperature of 85° C. under stirring. As for the dropwise addition times and the dropwise addition sequences, 80% AA was added dropwise over 180 minutes after the start of the reaction at a constant rate, 60% IPN50 was added dropwise over 120 minutes after the start of the reaction at a constant rate, 15% NaPS was added dropwise over 210 minutes after the start of the reaction at a constant rate, 35% SBS was added dropwise over 200 minutes after the start of the reaction at a constant rate, and pure water was added dropwise over 200 minutes after the start of the reaction at a constant rate. As for the timing of the start of the dropwise additions, the dropwise additions of 80% AA, 60% IPN50, 15% NaPS, 35% SBS, and pure water were started at the same time. The timing of the start of the dropwise addition of 80% AA, 60% IPN50, 15% NaPS, 35% SBS, and pure water was defined as the start of the reaction. After completion of all the dropwise additions, the reaction solution was maintained at 85° C. for additional 30 minutes to be aged to complete the polymerization.

Thus, a polymer composition 1 (hereinafter, also referred to as "Polymer 1") having a weight average molecular weight (Mw) of 75000 (Conditions 1 for GPC) and a solid content of 45.3% was obtained.

Synthesis Example 2 (Polymer Composition 2)

1) Synthesis of N-(3-allyloxy-2-hydroxypropyl)-diethanolamine

A 1000-mL four-necked glass flask equipped with a reflux condenser and a stirrer (paddle blades) was charged with 235.9 g of diethanolamine and 121.8 g of water, and the contents were heated to 60° C. under stirring. Subsequently, 251.1 g of allyl glycidyl ether (hereinafter, also referred to as "AGE") was added over 60 minutes, and then the contents were reacted for 5 hours. Thus, N-(3-allyloxy-2-hydroxypropyl)-diethanolamine-containing composition (hereinafter, also referred to as "80% AGE-DEA") was obtained.

2) Polymerization

A 2.5-L SUS316 vessel equipped with a thermometer, a reflux condenser, and a stirrer was charged with 257.6 g of pure water, and the water was heated to 90° C. under stirring (initial preparation).

Subsequently, 450.0 g of 80% AA, 112.5 g of 80% AGE-DEA, 144.3 g of 15% NaPS, and 108.2 g of 35% SBS were added dropwise through different dropping nozzles to the polymerization reaction system having a constant temperature of 90° C. under stirring. As for the dropwise addition times and the dropwise addition sequences, 80% AA was added dropwise over 180 minutes after the start of the reaction at a constant rate, 80% AGE-DEA was added dropwise over 160 minutes after the start of the reaction at a constant rate, 15% NaPS was added dropwise over 190 minutes after the start of the reaction at a constant rate, and 35% SBS was added dropwise over 190 minutes after the start of the reaction at a constant rate. As for the timing of the start of the dropwise additions, the dropwise additions of 80% AA, 80% AGE-DEA, 15% NaPS, and 35% SBS were started at the same time. The timing of the start of the dropwise addition of 80% AA, 80% AGE-DEA, 15% NaPS, 35% SBS, and pure water was defined as the start of the reaction. After completion of all the dropwise additions, the reaction solution was maintained at 85° C. for additional 30 minutes to be aged to complete the polymerization.

Thus, a polymer composition 2 (hereinafter, also referred to as "Polymer 2") having a weight average molecular weight (Mw) of 7200 (Conditions 1 for GPC) and a solid content of 54.7% was obtained.

Synthesis Example 3 (Polymer Composition 3)

1) Synthesis of 1-allyloxy-3-butoxypropan-2-ol

A 500-mL four-necked glass flask equipped with a reflux condenser and a stirrer (paddle blades) was charged with 370.0 g of n-butyl alcohol and 4.27 g of pelletized sodium hydroxide, and the contents were heated to 60° C. under stirring. Subsequently, 57.0 g of AGE was added over 30 minutes, and then the contents were reacted for 5 hours. This solution was put into a 1000-mL eggplant flask, and the solvent was removed using a rotary evaporator. Thus, a 1-allyloxy-3-butoxypropan-2-ol-containing composition (hereinafter, also referred to as "PAB") was obtained.

2) Polymerization

A 1000-mL glass separable flask equipped with a reflux condenser and a stirrer was charged with 100.0 g of pure water and 0.0126 g of Mohr's salt, and the contents were heated to 85° C. under stirring to prepare a polymerization reaction system. Subsequently, 159.4 g of 80% AA, 85.0 g of PAB, 88.9 g of 15% NaPS, and 38.1 g of 35% SBS were added dropwise through different nozzles to the polymerization reaction system having a constant temperature of 85° C. under stirring. As for the dropwise addition times of the solutions, 80% AA was added dropwise over 180 minutes, PAB was added dropwise over 120 minutes, 15% NaPS was added dropwise over 210 minutes, and 35% SBS was added dropwise over 175 minutes. The dropwise additions of the solutions were started at the same time, and they were each added dropwise at a constant rate, continuously. After completion of the dropwise addition, the reaction solution was maintained (aged) at 85° C. for additional 30 minutes to complete the polymerization.

Thus, a polymer composition 3 (hereinafter, also referred to as "Polymer 3") having a weight average molecular weight (Mw) of 18000 (Conditions 1 for GPC) and a solid content of 50.7% was obtained.

Synthesis Example 4 (Polymer Composition 4)

1) Synthesis of sodium 3-allyloxy-2-hydroxy-1-propane sulfonate

A stainless steel reaction vessel equipped with a thermometer, a stirrer, a nitrogen inlet tube, and a cold trap provided at a nitrogen outlet was charged with 161.9 g of deionized water and 76.3 g of a 48% aqueous solution of sodium hydroxide while nitrogen was introduced. Then, 549.0 g of a 35% aqueous solution of sodium bisulfite was added thereto. The temperature of the liquid was heated to 63° C., and 212.9 g of AGE was added over 225 minutes. After completion of the dropwise addition of allyl glycidyl ether, the temperature of the reaction solution was maintained at 63° C. for 30 minutes. Hereinafter, the resulting sodium 3-allyloxy-2-hydroxy-1-propanesulfonate-containing composition is also referred to as "40% HAPS".

2) Polymerization

A 2.5-L SUS316 separable flask equipped with a thermometer, a reflux condenser, and a stirrer was charged with 267.5 g of pure water, 100.0 g of 40% HAPS, and 0.033 g of Mohr's salt (3 ppm in terms of the mass of iron (II) based on the total prepared amount), and the contents were heated to a reflux condition at the boiling point under stirring (initial preparation).

Subsequently, 464.9 g of 80% AA, 518.3 g of 40% HAPS, 165.5 g of 15% NaPS, and 56.2 g of 35% SBS were added dropwise through different dropping nozzles to the copolymerization reaction system in the reflux condition at the boiling point under stirring. As for the dropwise addition times, 80% AA was added dropwise over 180 minutes, 40% HAPS was added dropwise over 130 minutes, 35% SBS was added dropwise over 170 minutes, and 15% NaPS was added dropwise over 200 minutes. As for the timing of the start of the dropwise additions, the dropwise additions of all the solutions were started at the same time. As for 15% NaPS, a 78.3-g portion thereof was continuously added dropwise over 0 to 130 minutes at a constant rate, and the remaining 87.2 g was added dropwise continuously over 130 to 200 minutes at a constant rate. As for 80% AA, 40% HAPS, and 35% SBS, each was added dropwise at a constant rate, continuously, during dropwise addition. After completion of the dropwise addition, the reaction solution was maintained in the reflux condition at the boiling point for additional 30 minutes to be aged to complete the copolymerization.

Thus, a polymer composition 4 (hereinafter, also referred to as "Polymer 4") having a weight average molecular weight (Mw) of 20000 (Conditions 2 for GPC) and a solid concentration of 46% was obtained.

Preparation of Film

Example 1 (Water-Soluble Film 1)

To a 50-mL screw tube were added 2.6 g of Polymer 1, 4.8 g of polyvinyl alcohol (weight average molecular weight (Mw): 85000 to 124000, degree of saponification: 87% to 89%) (a reagent produced by ALDRICH), and 32.6 g of water in the stated order. The solids were dissolved while the contents were repeatedly heated and stirred in a water bath having a temperature of 70° C. to prepare an aqueous solution with a solid content of 15%. The resulting aqueous solution was applied to a release film (a PET film treated with silicon) using an applicator. The aqueous solution was applied to a thickness such that the dried matter of the aqueous solution had a thickness falling within the range of 10 μm to 30 μm. The release film after the application treatment was dried in a hot air circulating oven at 100° C. for 10 minutes. Then, the release film was taken out from the oven and cooled to room temperature, and was then removed to obtain a water-soluble film 1.

Example 2 (Water-Soluble Film 2)

To a 50-mL screw tube were added 5.3 g of Polymer 1, 3.6 g of polyvinyl alcohol (weight average molecular weight (Mw): 85000 to 124000, degree of saponification: 87% to 89%) (a reagent produced by ALDRICH), and 31.1 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 2.

Example 3 (Water-Soluble Film 3)

To a 50-mL screw tube were added 7.9 g of Polymer 1, 2.4 g of polyvinyl alcohol (weight average molecular weight (Mw): 85000 to 124000, degree of saponification: 87% to 89%) (a reagent produced by ALDRICH), and 29.7 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 3.

Example 4 (Water-Soluble Film 4)

To a 50-mL screw tube were added 10.6 g of Polymer 1, 1.2 g of polyvinyl alcohol (weight average molecular weight (Mw): 85000 to 124000, degree of saponification: 87% to 89%) (a reagent produced by ALDRICH), and 29.7 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 4.

Example 5 (Water-Soluble Film 5)

To a 50-mL screw tube were added 4.4 g of Polymer 2, 3.6 g of polyvinyl alcohol (weight average molecular weight (Mw): 85000 to 124000, degree of saponification: 87% to 89%) (a reagent produced by ALDRICH), and 32.0 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 5.

Example 6 (Water-Soluble Film 6)

To a 50-mL screw tube were added 5.1 g of Polymer 3, 3.6 g of polyvinyl alcohol (weight average molecular weight (Mw): 85000 to 124000, degree of saponification: 87% to 89%) (a reagent produced by ALDRICH), and 31.4 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 6.

Example 7 (Water-Soluble Film 7)

To a 50-mL screw tube were added 5.2 g of Polymer 4, 3.6 g of polyvinyl alcohol (weight average molecular weight (Mw): 85000 to 124000, degree of saponification: 87% to 89%) (a reagent produced by ALDRICH), and 31.2 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a water-soluble film 7.

Comparative Example 1 (Comparative Film 1)

To a 50-mL screw tube were added 5.2 g of AQUALIC HL415 (polyacrylic acid, weight average molecular weight (Mw): 12000 (Conditions 3 for GPC), solid content: 45.7%, hereinafter, also referred to as "HL415") produced by Nippon Shokubai Co., Ltd., 3.6 g of polyvinyl alcohol (weight average molecular weight (Mw): 85000 to 124000, degree of saponification: 87% to 89%) (a reagent produced by ALDRICH), and 31.2 g of water in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a comparative water-soluble film (Comparative film 1).

Comparative Example 2 (Comparative Film 2)

To a 50-mL screw tube were added 44.0 g of water and 6.0 g of polyvinyl alcohol (weight average molecular weight (Mw): 85000 to 124000, degree of saponification: 87% to 89%) (a reagent produced by ALDRICH) in the stated order. The solids were dissolved while the contents were repeatedly heated and stirred in a water bath having a temperature of 70° C. to prepare an aqueous solution having a solid content of 15%. The resulting aqueous solution was subjected to the same steps as in Example 1 to obtain a comparative water-soluble film (Comparative film 2).

The monomer configurations and other specifications of the anionic group-containing polymers (Polymers 1 to 4) used in the examples and HL415 used in Comparative Example 1 are shown in Table 1. Further, the films obtained in the examples and the comparative examples were subjected to the following evaluation tests. The results are shown in Table 2.

<Evaluation Tests>

1. Evaluation of Solubility

A 100-mL beaker was charged with 100 g of pure water having a temperature of 6° C. to 7° C., and the water was stirred using a magnetic stirrer and a stirring bar. A 4×4 cm film specimen cut from each film was placed in water under stirring, and the time required for completely dissolving the film specimen (time from when the film specimen was placed in water until when the film specimen disappeared from view) was measured. The resulting time (dissolution time) was shown in Table 2.

Further, these dissolution times were converted to the dissolution times of a 40-µm-thick film using the following formula (1):

Dissolution time (in the case of 40 µm) (second)= (40/thickness of film (µm))$^2$×dissolution time (second) (1). A shorter dissolution time (in the case of 40 µm) means better solubility.

2. Evaluation of Hard Water Resistance

To a 1-L beaker containing 67.6 g of glycine and 52.6 g of sodium chloride were added pure water and 48% sodium hydroxide to prepare 600 g of a glycine buffer stock solution with a pH of 10. A 54.0-g portion of the glycine buffer stock solution was placed in a 1-L beaker and diluted with pure water to prepare 1000 g of a glycine buffer dilution. Separately, a film was dissolved in water to prepare a 2.5% aqueous solution of the film. To 2.5 g of the aqueous solution of the film was added a 80-g portion of the glycine buffer dilution. Thus, a test solution was prepared. Separately, a 1 mol/L aqueous solution of calcium chloride was prepared as hard water. A 0.1-mL portion of the hard water was dropwise added to the test solution every three seconds using an automatic titrator COM-1700 produced by Hiranuma Sangyo Corporation. At the time when 6 mL of the hard water was dropwise added in total, the transmittance of 650-nm light was measured. A value closer to 100 means better hard water resistance.

3. Evaluation of Strength

A 11.84-g metal ball was dropped freely onto a 3×3 cm film specimen cut from each film. The position from which the ball is dropped was adjusted, and the potential energy of the metal ball at the height of the drop-start position that leads to film breakage was determined as strength using the following formula (2):

Strength (J)=0.01184 (kg)×9.8 (m/s$^2$)×height from which metal ball was dropped (m) (2). The results are shown in Table 2.

Further, the thus-determined value was converted to the strength of a 40-µm-thick film using the following formula (3):

Strength (in the case of 40 µm) (J)=(40/thickness of film (µm))$^2$×strength (J) (3). A larger value means higher strength.

The thickness of the film was measured using Coolant Proof Micrometer IP65. The thicknesses of six random points of the film were measured and averaged to determine the average thickness of the film.

4. Extensibility

A 1.5×9.0 cm film specimen cut from each film was stretched using a tensile testing machine (produced by Shimadzu Corporation, Autograph AGS-100D) under the conditions of room temperature, initial gage length of 60 mm, and tensile speed of 5 ram/min, and the strain when the film broke (maximum strain) (%) was evaluated as extensibility. A larger maximum strain means higher extensibility.

5. Deodorant Properties

A glass petri dish was prepared, and 2.5 g of a film was placed therein. Separately, an empty petri dish was prepared as a blank. These petri dishes were each completely sealed in a sampling bag with a sleeve (produced by GL Sciences Inc., Smart Bag PA, volume: 3 L) by heat sealing. A vacuum was created in each sampling bag, and then 2 L of nitrogen gas was introduced thereinto. Each petri dish was opened in the bag, and then 5 mL of acetic acid-saturated nitrogen gas was introduced thereinto using a syringe. After 2-hour standing, 100 mL of the air was suctioned from the bag and the reduction rate (%) was determined by comparison of the acetic acid concentrations using an acetic acid detector tube (produced by Gastec Corporation, No. 81 or 81L). The measured value was converted to the acetic acid concentration using the conversion scale described in the manual of the detector tube.

The reduction rate of the acetic acid was determined using the following equation.

Reduction rate (%)={(Gas concentration for blank)− (Gas concentration for sample)}÷(Gas concentration for blank)×x100

6. Anti-Soil Redeposition Properties

A cotton cloth obtained from Test fabric Inc. was cut into 5 cm×5 cm pieces of white cloth. The brightness of each of white cloth pieces was previously measured with a color difference meter SE6000 produced by Nippon Denshoku Industries Co., Ltd. based on the reflectance. Pure water was added to 5.88 g of calcium chloride dihydrate to prepare 20 kg of hard water. Separately, pure water was added to 8.0 g of sodium dodecylbenzenesulfonate, 9.5 g of sodium hydrogen carbonate, and 8.0 g of sodium sulfate to prepare 80.0 g of a mixture. Then, a 48% aqueous sodium hydroxide solution was added to the mixture to adjust the pH to 8.5, and pure water was added thereto to prepare 100 g of an aqueous solution of a surfactant. The temperature of a Terg-O-tometer was set at 25° C. A pot was charged with 2 L of the hard water, 5 g of the aqueous surfactant solution, 5 g (in terms of solid content) of a 4.0% aqueous solution of the film, 0.30 g of zeolite, and 1.0 g of clay (JIS Class 11). The contents were stirred at 100 rpm for one minute. Thereafter, seven white cloth pieces were placed in the pot and stirred at 100 rpm for 10 minutes. Thereafter, the white cloth pieces were taken out, water was removed from the white cloth pieces by hand, and the white cloth pieces were placed in a pot containing 2 L of hard water at 25° C. They were stirred at 100 rpm for 2 minutes. The white cloth pieces were covered with an ironing cloth and smoothed with an iron to dry. Thereafter, the brightness of each of the white cloth pieces was again measured with the color difference meter based on the reflectance. The anti-soil redeposition rate was determined from the measurement results using the following equation:

Anti-soil redeposition rate (%)=(Brightness after washing)/(Brightness of original white cloth)×100

A higher anti-soil redeposition rate means better anti-soil redeposition properties.

7. Carbon Black Dispersibility

Pure water was added to 67.56 g of glycine, 52.60 g of sodium chloride, and 5.00 g of 48% sodium hydroxide to prepare 600.0 g of a mixture, and the mixture was adjusted to a pH of 10 with 48% sodium hydroxide to prepare a glycine buffer. Next, pure water was added to 6.00 g of the glycine buffer and 11.10 g of ethanol to prepare 1000.0 g of a dispersion. Separately, about 10 g of a 0.5% aqueous solution of the film (in terms of solid content) obtained in the corresponding example or comparative example was prepared. To a 100-ml screw-cap bottle containing 0.03 g of carbon black were added 9.0 g of the 5.0% aqueous solution of the film and 81.0 g of the dispersion to prepare a test solution. The screw-cap bottle containing the test solution was treated in an ultrasonic bath for 5 minutes. Then, a 10-mm stirrer bar was placed therein and the test solution was further stirred at 500 rpm for 5 minutes. After the stirring was stopped and the test solution was allowed to stand for 3 hours, the appearance of the test solution was observed. Evaluation was performed based on the following criteria.

(1) Hydration of Carbon Black

Good: Carbon black was hardly visually observed at the liquid surface.

Fair: A small amount of carbon black floating on the liquid surface was visually observed.

Bad: A large amount of carbon black floating on the liquid surface was visually observed.

(2) Dispersion of Carbon Black

Good: Much better dispersion of carbon black in the liquid was visually observed.

Fair: Uniform dispersion of carbon black in the liquid was visually observed.

Bad: No dispersion of carbon black in the liquid was visually observed.

8. Detergency

Artificially contaminated wet cloth was obtained as artificially contaminated cloth from Laundry Science Association (Sentaku Kagaku Kyokai). The brightness of the artificially contaminated cloth was previously measured with a color difference meter SE6000 (produced by Nippon Denshoku Industries Co., Ltd.) based on the reflectance. Pure water was added to 1.47 g of calcium chloride dihydrate to prepare 10 kg of hard water. Separately, pure water was added to 4.8 g of polyoxyethylene lauryl ether sodium sulfate (AES), 0.6 g of polyoxyethylene lauryl ether (AE), 0.6 g of sodium borate, 0.9 g of citric acid, and 2.4 g of propylene glycol to prepare 80 g of a mixture. The mixture was adjusted to a pH of 8.2 with an aqueous sodium hydroxide solution, and pure water was added to the solution to prepare 100 g of an aqueous surfactant solution. The temperature of a Terg-o-Tometer was set at 27° C. A pot was charged with 1000 mL of the hard water, 5 mL of a 2.75% solution of the film (in terms of solid content) obtained in the corresponding example or comparative example, 4.8 mL of the aqueous surfactant solution, five pieces of artificially contaminated cloth, and five pieces of cotton white cloth prepared in conformity with JIS L 0803. The contents were stirred at 100 rpm for 10 minutes. The artificially contaminated cloth pieces were taken out from the pot, and water was removed therefrom by hand. Next, 1000 mL of the hard water was placed in a pot and then the artificially contaminated cloth pieces from which water was removed were placed therein, and they were stirred at 100 rpm for 2 minutes. The artificially contaminated cloth pieces were taken out from the pot, and water was removed therefrom by hand. The artificially contaminated cloth pieces were covered with an ironing cloth and smoothed with an iron to dry. The brightness of each of the dried artificially contaminated cloth pieces was measured with a color difference meter based on the reflectance. The washing rate (%) was determined based on the values determined by this method using the following equation.

Washing rate (%)={(Brightness of artificially contaminated cloth pieces after washing)−(brightness of artificially contaminated cloth before washing)}÷{(brightness of original white cloth (EMPA221) before artificially contaminated)−(brightness of artificially contaminated cloth before washing)}×100

9) Clay Dispersibility

Pure water was added to 67.56 g of glycine, 52.60 g of sodium chloride, and 5.00 g of 48% sodium hydroxide to prepare 600.0 g of a glycine buffer having a pH of 8.5. Subsequently, 0.147 g of calcium chloride and pure water were added to a 60.0-g portion of the glycine buffer to prepare 1000.0 g of a dispersion. Separately, about 10 g (in terms of solid content) of a 0.1% aqueous solution of each of the films obtained in the examples and the comparative examples was prepared.

Subsequently, the same number of 30-mL test tubes with an inner diameter of 16 mm as the samples to evaluate were prepared. Then, 0.30 g of clay (JIS Class 11) was put into each test tube, and a 27.0-g portion of the dispersion was put thereinto. Then, 3.0 g of a 0.5% aqueous solution of the film was put into the test tube, and the test tube was capped with a septum. Thus, an aqueous suspension containing 1% of clay and 100 ppm of a sample solid was prepared in the test tube. The aggregated clay in the test tube was broken by gently shaking the test tube, and the test tube was gently inverted back and forth 60 times. Thereafter, the cap was taken off, and the test tube was allowed to stand on a horizontal stable position. After 5-hour standing, 5 mL of a supernatant was taken using a one-mark pipette. The supernatant was measured for absorbance at 380 nm using an ultraviolet and visible spectrophotometer "UV-1800" produced by Shimadzu Corporation. The resulting absorbance was defined as the dispersibility. A larger value of the absorbance indicates a higher dispersibility.

TABLE 1

| | Monomer configuration | | | Solid content |
|---|---|---|---|---|
| | Type | Mass ratio | Mw | mass % |
| Polymer 1 | AA/IPN50 | 50/50 | 75000 | 45.3 |
| Polymer 2 | AA/AGE-DEA | 80/20 | 7200 | 54.7 |
| Polymer 3 | AA/PAB | 60/40 | 18000 | 46.9 |
| Polymer 4 | AA/HAPS | 60/40 | 20000 | 46.1 |
| HL415 | AA | 100 | 12000 | 45.7 |

TABLE 2

| | Anionic group-containing polymer | | | | Dissolution time | | Strength | | Hard |
|---|---|---|---|---|---|---|---|---|---|
| | Type | Blend proportion (mass %) | Thickness μm | Dissolution time second | (in the case of 40 μm) second | Strength J | (in the case of 40 μm) J | | water resistance % |
| Example 1 | Polymer 1 | 20 | 16 | 22 | 138 | 0.1 | 0.6 | | — |
| Example 2 | Polymer 1 | 40 | 10 | 10 | 160 | 0.1 | 1.6 | | 97.9 |
| Example 3 | Polymer 1 | 60 | 20 | 4 | 16 | 0.1 | 0.4 | | — |
| Example 4 | Polymer 1 | 80 | 10 | — | — | — | — | | — |
| Example 5 | Polymer 2 | 40 | 14 | 12 | 98 | 0.02 | 0.2 | | 98.8 |
| Example 6 | Polymer 3 | 40 | 12 | 16 | 178 | 0.01 | 0.1 | | 98.7 |
| Example 7 | Polymer 4 | 40 | 17 | 10 | 55 | 0.01 | 0.1 | | 98.8 |
| Comparative Example 1 | HL415 | 40 | 13 | 5 | 47 | 0.01 | 0.1 | | 93.4 |
| Comparative Example 2 | — | | 0 | 28 | 120 | 245 | 0.1 | 0.2 | — |

Table 2 demonstrates the followings.

Examples 1 to 7 and Comparative Example 2 differ mainly in whether an anionic group-containing polymer is used or not. The strength (in the case of 40 μm) of each of the water-soluble films obtained in Examples 1 to 7 is substantially equal to or higher than that of the water-soluble film obtained in Comparative Example 2, and a remarkable difference in dissolution time is observed. Thus, the water-soluble films having a structure containing a polyvinyl alcohol and an anionic group-containing polymer have high solubility in cold water while the film strength is sufficiently prevented from being reduced.

Examples 2 and 5 to 7 and Comparative Example 1 differ mainly in whether the anionic group-containing polymer in the present invention is used or an acrylic acid homopolymer is used. Particularly, they differ in hard-water resistance. Thus, the use of an anionic group-containing polymer other than the acrylic acid homopolymer remarkably improves the hard-water resistance.

Although not shown in the table, the films obtained in Examples 1 to 7 were also found to be excellent in extensibility, deodorant properties, anti-soil redeposition properties, detergency, and dispersibility (dispersibility of carbon black and clay).

The invention claimed is:

1. A water-soluble film comprising:
  a polymer containing an anionic group other than a sulfonic acid (salt) group; and
  a water-soluble resin,
  the anionic group-containing polymer excluding an acrylic acid homopolymer,
  the anionic group-containing polymer further containing, in addition to the anionic group, at least one group selected from the group consisting of sulfonic acid (salt) groups, cationic groups, (poly)alkylene glycol groups, hydrophobic groups, and lactam groups,
  the cationic groups being derived from a monomer unit derived from a compound represented by the formula (3):

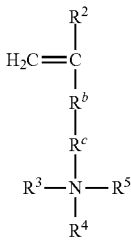

(3)

wherein $R^2$ represents a hydrogen atom or a $CH_3$ group; $R^b$ represents a $CH_2$ group, a $CH_2CH_2$ group, or a direct bond; $R^c$ represents —O—$CH_2$—CH(OH)—$CH_2$—, —O—$CH_2$—CH($CH_2$OH)—, —O-($A^1$O)$_m$—$CH_2$—CH(OH)—$CH_2$—, or —O-($A^1$O)$_m$—$CH_2$—CH($CH_2$OH)— where A'Os are the same as or different from each other and each represent a C2-C18 oxyalkylene group and m is an average number of moles of an oxyalkylene group added represented by $A^1$O and is 1 to 300; and $R^3$, $R^4$, and $R^5$ are the same as or different from each other and each represent a hydrogen atom or a C1-C30 organic group where one of $R^3$, $R^4$, and $R^5$ may be absent,
  the hydrophobic groups being derived from a monomer unit derived from a compound represented by the formula (5):

(5)

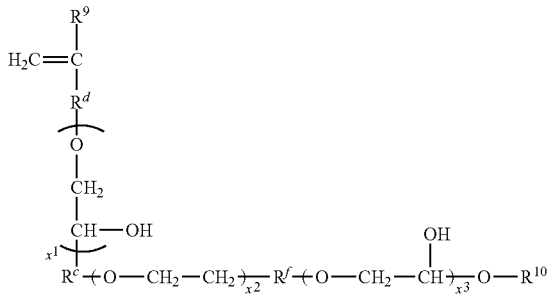

wherein $R^9$ represents a hydrogen atom or a $CH_3$ group; $R^d$, $R^e$, and $R^f$ are the same as or different from each other and each represent a $CH_2$ group, a $CH_2CH_2$ group, or a direct bond; $x^1$ represents the number of units represented by (O—$CH_2$—CH(OH)) and is 0 or 1; $x^2$ represents the number of units represented by (O—$CH_2$—$CH_2$) and is 0 to 100; $x^3$ represents the number of units represented by (O—$CH_2$—CH(OH)) and is 0 or 1, where $x^2$ is 1 to 100 and $x^3$ is 1 when $R^d$, $R^e$, and $R^f$ each represent a direct bond and $x^1$ is 0; and $R^{10}$ represents a hydrophobic group, and the sulfonic acid (salt) groups being derived from a monomer unit derived from a compound represented by formula (2):

(3)

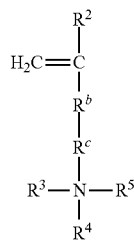

wherein in the formula (2), $R^1$ represents a hydrogen atom or a $CH_3$ group, $R^a$ represents a $CH_2$ group, a $CH_2CH_2$ group, or a direct bond, and X and Y are the same as one another or different from one another and each represents a hydroxy group or a sulfonic acid (salt) group, wherein at least one of X and Y represent a sulfonic acid (salt) group.

2. The water-soluble film according to claim 1, wherein the anionic group is a carboxyl group and/or a salt thereof.

3. The water-soluble film according to claim 1, wherein the anionic group-containing polymer has a weight average molecular weight of 2000 to 200000.

4. The water-soluble film according to claim 1, wherein the water-soluble resin is a polyvinyl alcohol-based polymer.

5. The water-soluble film according to claim 1, wherein the proportion of the anionic group-containing polymer is 1% by mass or more of 100% by mass of the total amount of the water-soluble resin and the anionic group-containing polymer.

6. The water-soluble film according to claim 1, wherein the proportion of the anionic group-containing polymer is 99% by mass or less of 100% by mass of the total amount of the water-soluble resin and the anionic group-containing polymer.

7. The water-soluble film according to claim 1, wherein the water-soluble film has a thickness of 5 to 300 m.

8. The water-soluble film according to claim 1, wherein the water-soluble film is used to package a chemical and/or a detergent.

9. A composition comprising:
a polymer containing an anionic group other than a sulfonic acid (salt) group; and
a water-soluble resin,
the anionic group-containing polymer excluding an acrylic acid homopolymer,
the anionic group-containing polymer further containing, in addition to the anionic group, at least one group selected from the group consisting of sulfonic acid (salt) groups, cationic groups, (poly)alkylene glycol groups, hydrophobic groups, and lactam groups,
the cationic groups being derived from a monomer unit derived from a compound represented by the formula (3):

(3)

wherein $R^2$ represents a hydrogen atom or a $CH_3$ group; $R^b$ represents a $CH_2$ group, a $CH_2CH_2$ group, or a direct bond; $R^c$ represents —O—$CH_2$—CH(OH)—$CH_2$—, —O—$CH_2$—CH($CH_2$OH)—, —O-($A'O^1$)$_m$—$CH_2$—CH(OH)—$CH_2$-, or —O-($A'O^1$)$_m$—$CH_2$—CH($CH_2$OH)— where A'Os are the same as or different from each other and each represent a C2-C18 oxyalkylene group and m is an average number of moles of an oxyalkylene group added represented by $A^1O$ and is 1 to 300; and $R^3$, $R^4$, and $R^5$ are the same as or different from each other and each represent a hydrogen atom or a C1-C30 organic group where one of $R^3$, $R^4$, and $R^5$ may be absent, the hydrophobic groups being derived from a monomer unit derived from a compound represented by the formula (5):

(5)

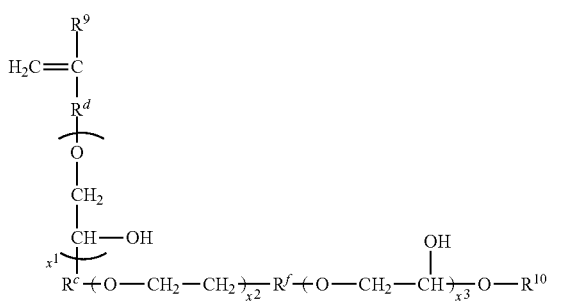

wherein R$^9$ represents a hydrogen atom or a CH$_3$ group; R$^d$, R$^e$, and R$^f$ are the same as or different from each other and each represent a CH$_2$ group, a CH$_2$CH$_2$ group, or a direct bond; x$^1$ represents the number of units represented by (O—CH$_2$—CH(OH)) and is 0 or 1; x$^2$ represents the number of units represented by (O—CH$_2$—CH$_2$) and is 0 to 100; x$^3$ represents the number of units represented by (O—CH$_2$—CH(OH)) and is 0 or 1, where x$^2$ is 1 to 100 and x$^3$ is 1 when R$^d$, R$^e$, and R$^f$ each represent a direct bond and x$^1$ is 0; and R$^{10}$ represents a hydrophobic group, and the sulfonic acid (salt) groups being derived from a monomer unit derived from a compound represented by formula (2):

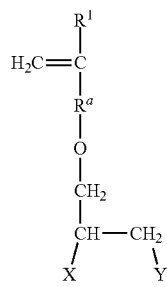

wherein in the formula (2), R$^1$ represents a hydrogen atom or a CH$_3$ group, R$^a$ represents a CH$_2$ group, a CH$_2$CH$_2$ group, or a direct bond, and X and Y are the same as one another or different from one another and each represents a hydroxy group or a sulfonic acid (salt) group, wherein at least one of X and Y represent a sulfonic acid (salt) group.

10. A packaged product comprising:
the water-soluble film according to claim 1; and
a chemical and/or a detergent packaged in the water-soluble film.

11. A method for producing a packaged product, comprising packaging a chemical and/or a detergent with the water-soluble film according to claim 1.

12. A packaging method comprising packaging a chemical and/or a detergent with the water-soluble film according to claim 1.

13. A method for producing a water-soluble film that includes a polymer containing an anionic group other than a sulfonic acid (salt) group and a water-soluble resin, the anionic group-containing polymer excluding an acrylic acid homopolymer, the method comprising the steps of:
polymerizing a monomer component including an anionic group-containing monomer; and
mixing an anionic group-containing polymer obtained in the polymerization step with a water-soluble resin,
the anionic group-containing polymer further containing, in addition to the anionic group, at least one group selected from the group consisting of sulfonic acid (salt) groups, cationic groups, (poly)alkylene glycol groups, hydrophobic groups, and lactam groups, the cationic groups being derived from a monomer unit derived from a compound represented by the formula (3):

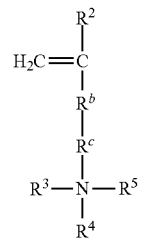

wherein R$^2$ represents a hydrogen atom or a CH3 group; R$^b$ represents a CH$_2$ group, a CH$_2$CH$_2$ group, or a direct bond; RC represents —O—CH$_2$—CH(OH)—CH$_2$—, —O—CH$_2$—CH(CH$_2$OH)—, —O—(A$^1$O)$_m$—CH$_2$—CH(OH)—CH$_2$—, or —O—(A$^1$O)$_m$—CH$_2$—CH(CH$_2$OH)— where A$^1$Os are the same as or different from each other and each represent a C2-C18 oxyalkylene group and m is an average number of moles of an oxyalkylene group added represented by A$^1$O and is 1 to 300; and R$^3$, R$^4$, and R$^5$ are the same as or different from each other and each represent a hydrogen atom or a C1-C30 organic group where one of R$^3$, R$^4$, and R$^5$ may be absent, the hydrophobic groups being derived from a monomer unit derived from a compound represented by the formula (5):

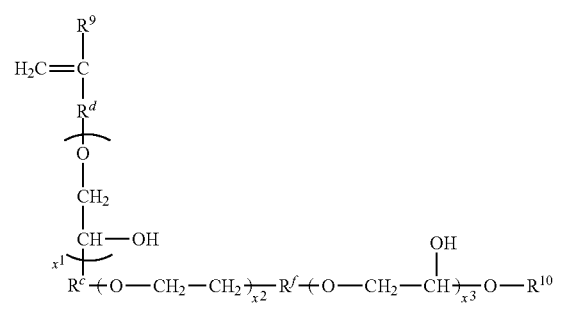

wherein R$^9$ represents a hydrogen atom or a CH$_3$ group; R$^d$, R$^e$, and R$^f$ are the same as or different from each other and each represent a CH$_2$ group, a CH$_2$CH$_2$ group, or a direct bond; x$^1$ represents the number of units represented by (O—CH$_2$—CH(OH)) and is 0 or 1; x$^2$ represents the number of units represented by (O—CH$_2$—CH$_2$) and is 0 to 100; x$^3$ represents the number of units represented by (O-CH2-CH(OH)) and is 0 or 1, where x$^2$ is 1 to 100 and x$^3$ is 1 when R$^d$, R$^e$, and R$^f$ each represent a direct bond and x$^1$ is 0; and R$^{10}$ represents a hydrophobic group, and the sulfonic acid (salt) groups being derived from a monomer unit derived from a compound represented by formula (2):

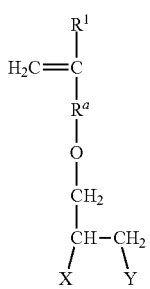

(2)

wherein in the formula (2), $R^1$ represents a hydrogen atom or a $CH_3$ group, $R^a$ represents a $CH_2$ group, a $CH_2CH_2$ group, or a direct bond, and X and Y are the same as one another or different from one another and each represents a hydroxy group or a sulfonic acid (salt) group, wherein at least one of X and Y represent a sulfonic acid (salt) group.

14. The method for producing a water-soluble film according to claim 13,
wherein the monomer component includes, in addition to the anionic group-containing monomer, a monomer containing at least one group selected from the group consisting of sulfonic acid (salt) groups, cationic groups, (poly)alkylene glycol groups, hydrophobic groups, and lactam groups.

15. A method of packaging at least one selected from the group consisting of a chemical and a detergent, comprising packaging at least one selected from the group consisting of the chemical and the detergent in a package comprising a composition that comprises a polymer containing an anionic group other than a sulfonic acid (salt) group and a water-soluble resin as a material of a water-soluble film,
the anionic group-containing polymer excluding an acrylic acid homopolymer,
the anionic group-containing polymer further containing, in addition to the anionic group, at least one group selected from the group consisting of sulfonic acid (salt) groups, cationic groups, (poly)alkylene glycol groups, hydrophobic groups, and lactam groups,
the cationic groups being derived from a monomer unit derived from a compound represented by the formula (3):

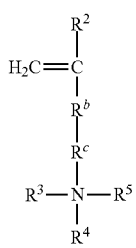

(3)

wherein $R^2$ represents a hydrogen atom or a $CH_3$ group; $R^b$ represents a $CH_2$ group, a $CH_2CH_2$ group, or a direct bond; $R^c$ represents —O—$CH_2$—CH(OH)—$CH_2$—, —O—$CH_2$—CH($CH_2$OH)—, —O—($A^1$O)$_m$—$CH_2$—CH(OH)—$CH_2$—, or —O—($A^1$O)$_m$—$CH_2$—CH($CH_2$OH)— where $A^1$Os are the same as or different from each other and each represent a C2-C18 oxyalkylene group and m is an average number of moles of an oxyalkylene group added represented by $A^1$O and is 1 to 300; and $R^3$, $R^4$, and $R^5$ are the same as or different from each other and each represent a hydrogen atom or a C1-C30 organic group where one of $R^3$, $R^4$, and $R^5$ may be absent,
the hydrophobic groups being derived from a monomer unit derived from a compound represented by the formula (5):

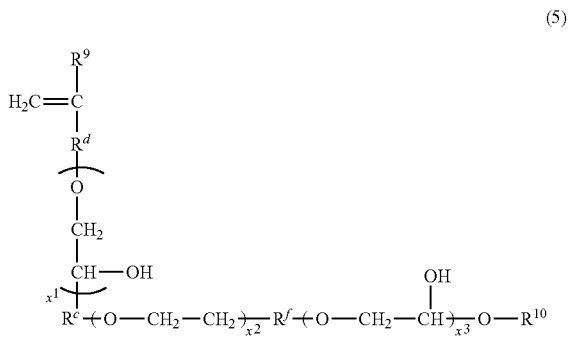

(5)

wherein $R^9$ represents a hydrogen atom or a $CH_3$ group; $R^d$, $R^e$, and $R^f$ are the same as or different from each other and each represent a $CH_2$ group, a $CH_2CH_2$ group, or a direct bond; $x^1$ represents the number of units represented by (O—$CH_2$—CH(OH)) and is 0 or 1; $x^2$ represents the number of units represented by (O—$CH_2$—$CH_2$) and is 0 to 100; $x^3$ represents the number of units represented by (O—$CH_2$—CH(OH)) and is 0 or 1, where $x^2$ is 1 to 100 and $x^3$ is 1 when $R^d$, $R^e$, and $R^f$ each represent a direct bond and $x^1$ is 0; and $R^{10}$ represents a hydrophobic group, and the sulfonic acid (salt) groups being derived from a monomer unit derived from a compound represented by formula (2):

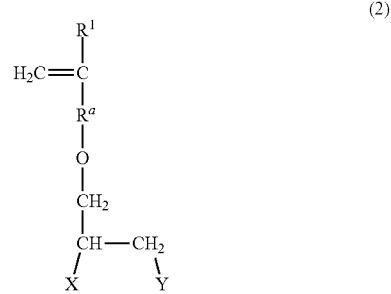

(2)

wherein in the formula (2), $R^1$ represents a hydrogen atom or a $CH_3$ group, $R^a$ represents a $CH_2$ group, a $CH_2CH_2$ group, or a direct bond, and X and Y are the same as one another or different from one another and each represents a hydroxy group or a sulfonic acid (salt) group, wherein at least one of X and Y represent a sulfonic acid (salt) group.

* * * * *